(12) United States Patent
Sugimoto et al.

(10) Patent No.: US 8,917,483 B2
(45) Date of Patent: Dec. 23, 2014

(54) SUSPENSION BOARD WITH CIRCUIT AND SUSPENSION BOARD ASSEMBLY SHEET WITH CIRCUIT, AND METHOD OF MANUFACTURING THE SAME

(71) Applicant: Nitto Denko Corporation, Osaka (JP)

(72) Inventors: Yuu Sugimoto, Osaka (JP); Takatoshi Sakakura, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 14/230,772

(22) Filed: Mar. 31, 2014

(65) Prior Publication Data

US 2014/0313619 A1 Oct. 23, 2014

(30) Foreign Application Priority Data

Apr. 19, 2013 (JP) ................................ 2013-088031

(51) Int. Cl.
*G11B 5/48* (2006.01)
*G11B 5/84* (2006.01)

(52) U.S. Cl.
CPC *G11B 5/484* (2013.01); *G11B 5/84* (2013.01); *G11B 5/4846* (2013.01)
USPC ...................................................... 360/245.9

(58) Field of Classification Search
USPC .............................................. 360/245–245.9
See application file for complete search history.

(56) References Cited

U.S. PATENT DOCUMENTS

| 7,286,370 B2 * | 10/2007 | Ooyabu | 361/803 |
| 2005/0272276 A1 * | 12/2005 | Ooyabu | 439/35 |
| 2012/0134056 A1 | 5/2012 | Yamada | |

FOREIGN PATENT DOCUMENTS

JP 2012-119032 A 6/2012

* cited by examiner

*Primary Examiner* — Allen T Cao
(74) *Attorney, Agent, or Firm* — Panitch Schwarze Belisario & Nadel LLP

(57) ABSTRACT

First and second laminated structures are respectively formed at one surface and the other surface of an insulating layer. A laminate is formed of the first laminated structure, the insulating layer and the second laminated structure. A heat-assisted wiring trace is included in the first laminated structure, and a support substrate and a connection terminal are included in the second laminated structure. The surface of the connection terminal is exposed at the other surface of the insulating layer. A first portion of the laminate including the connection terminal has a thickness smaller than the thickness of second and third portions of the laminate including portions on both sides of the connection terminal.

11 Claims, 20 Drawing Sheets

CROSS SECTIONAL VIEW
TAKEN ALONG LINE B-B

TOP VIEW

CROSS SECTIONAL VIEW
TAKEN ALONG LINE B-B

BOTTOM VIEW

CROSS SECTIONAL VIEW
TAKEN ALONG LINE B-B

BOTTOM VIEW

SUSPENSION BOARD WITH CIRCUIT AND SUSPENSION BOARD ASSEMBLY SHEET WITH CIRCUIT, AND METHOD OF MANUFACTURING THE SAME

BACKGROUND OF THE INVENTION

1. Field of the Invention

The present invention relates to a suspension board with a circuit, a suspension board assembly sheet with a circuit and a method of manufacturing the suspension board with a circuit and the suspension board assembly sheet with a circuit.

2. Description of Related Art

Actuators are used in drives such as hard disc drives. Such an actuator includes an arm provided rotatably around a rotation shaft, and a suspension board with a circuit for a magnetic head that is attached to the arm. The suspension board with a circuit is a printed circuit board for positioning the magnetic head at a desired track of a magnetic disc.

Generally, in the suspension board with a circuit, a wiring is formed at one surface, and a metal substrate is formed at another surface, of an insulating layer. In a suspension described in JP 2012-119032 A, a plurality of conductors are formed at the upper surface of the insulating layer, and a metal base is formed at the lower surface of the insulating layer. An electrical circuit portion that is electrically independent from the metal base is formed at the lower surface of the insulating layer. End portions of part of the plurality of conductors are connected to the electrical circuit portion via a conductor coupling portion that penetrates the insulating layer.

BRIEF SUMMARY OF THE INVENTION

In recent years, as the suspension described in JP 2012-119032 A, various types of suspension boards with a circuit that have a connection terminal electrically connected to a wiring at the upper surface of the insulating layer and electrically insulated from a metal substrate at the lower surface of the insulating layer have been developed. However, the connection terminal at the lower surface of the insulating layer is likely to come into contact with another member.

For example, when the plurality of suspension boards with a circuit are manufactured using a roll-to-roll system, a long-sized suspension board assembly sheet with a circuit (hereinafter referred to as an assembly sheet) that includes the plurality of suspension boards with a circuit is wound around a roll. Thus, the plurality of suspension boards with a circuit of the assembly sheet overlap with another suspension board with a circuit. In this case, the connection terminal at the lower surface of the upper suspension board with a circuit comes into contact with the upper surface of the lower suspension board with a circuit. Therefore, the likelihood of contamination or damage at the connection terminal is increased.

In particular, when the connection terminal is coated with a gold plating or the like, the likelihood that the connection terminal at the lower surface of the upper suspension board with a circuit comes into contact with the upper surface of the lower suspension board with a circuit is further increased. Therefore, the gold plating or the like may be stripped from the connection terminal.

An object of the present invention is to provide a suspension board with a circuit and a suspension board assembly sheet with a circuit in which the likelihood of contamination or damage at a connection terminal is reduced, and a method of manufacturing the suspension board with a circuit and the suspension board assembly sheet with a circuit.

(1) According to one aspect of the present invention, a suspension board with a circuit includes a first insulating layer, a first laminated structure formed on one surface of the first insulating layer, and a second laminated structure formed on another surface of the first insulating layer, wherein the first laminated structure includes a conductor layer, and the second laminated structure includes a conductive support substrate, and a connection terminal electrically connected to the conductor layer and electrically insulated from the support substrate, the connection terminal has a surface exposed at the other surface, a laminate is formed of the first laminated structure, the first insulating layer and the second laminated structure, and a first portion of the laminate including the connection terminal has a thickness smaller than thickness of second and third portions of the laminate including portions on both sides of the connection terminal.

In this suspension board with a circuit, the first and second laminated structures are respectively formed on the one surface and the other surface of the first insulating layer. The laminate is formed of the first laminated structure, the first insulating layer and the second laminated structure. The conductor layer is included in the first laminated structure, and the support substrate and the connection terminal are included in the second laminated structure. The surface of the connection terminal is exposed at the other surface of the first insulating layer.

Here, the first portion of the laminate including the connection terminal has a thickness smaller than the thickness of the second and third portions of the laminate including portions on both sides of the connection terminal. Therefore, when the suspension board with a circuit comes into contact with another member, the second and third portions of the laminate come into contact with another member, and therefore, the likelihood that the surface of the connection terminal of the first portion of the laminate comes into contact with another member is reduced. Thus, the likelihood of contamination or damage at the connection terminal can be reduced.

(2) The connection terminal may have a thickness smaller than thickness of the second and third portions of the second laminated structure.

In this case, a recess is formed between the second and the third portions of the second laminated structure, and the surface of the connection terminal is positioned in the recess. Thus, the likelihood of the contamination or damage at the connection terminal can be easily reduced.

(3) The second and third portions of the second laminated structure may include one and another portions of the support substrate, and the connection terminal may have a thickness smaller than thickness of each of the one and the other portions of the support substrate.

In this case, a recess is formed between the one and the other portions of the support substrate, and the surface of the connection terminal is positioned in the recess. Thus, the likelihood of contamination or damage at the connection terminal can be reduced. Further, the thickness of the connection terminal is processed to be smaller than that of the one and the other portions of the support substrate, whereby it is possible to reduce the thickness of the first portion of the laminate to be smaller than that of the second and third portions of the laminate without providing another member at the support substrate.

(4) The second and third portions of the second laminated structure may include one portion and another portion of the support substrate, and a first support layer formed on the one portion and the other portion of the support substrate, and the connection terminal may have a thickness smaller than total thickness of the one portion and the other portion of the support substrate and the first support layer.

In this case, a recess is formed between the first support layers of the second and third portions of the second laminated structure, and the surface of the connection terminal is positioned in the recess. Thus, the likelihood of contamination or damage at the connection terminal can be reduced. Further, it is possible to reduce the thickness of the first portion of the laminate to be smaller than that of the second and third portions of the laminate without adjusting the thickness of the support substrate and the connection terminal.

(5) The first portion of the first laminated structure may have a thickness smaller than the thickness of the second and third portions of the first laminated structure.

In this case, a recess is formed at the first portion between the second and third portions of the first laminated structure. Thus, when the plurality of suspension boards with a circuit are stacked, the connection terminal of the upper suspension board with a circuit can be positioned in the recess of the lower suspension board with a circuit. Therefore, the connection terminal of the upper suspension board with a circuit is prevented from coming into contact with the upper surface of the lower suspension board with a circuit.

In particular, even if the plurality of suspension boards with a circuit are manufactured using a roll-to-roll system, the connection terminal of the upper suspension board with a circuit of the plurality of suspension boards with a circuit that are vertically stacked can be positioned in the recess of the lower suspension board with a circuit. Thus, the connection terminal of the upper suspension board with a circuit is prevented from coming into contact with the upper surface of the lower suspension board with a circuit.

(6) The first portion of the first laminated structure may include part of the conductor layer, and the second and third portions of the first laminated structure may include a second support layer.

In this case, a recess is formed between the second support layers of the second and third portions of the first laminated structure, and the surface of the conductor layer is positioned in the recess. Thus, when the plurality of suspension boards with a circuit are stacked, the connection terminal of the upper suspension board with a circuit is prevented from coming into contact with the conductor layer of the lower suspension board with a circuit.

(7) The first laminated structure may further include a second insulating layer formed on one surface of the first insulating layer to cover the conductor layer. In this case, corrosion of the conductor layer can be prevented.

(8) According to another aspect of the present invention, a suspension board assembly sheet with a circuit includes a plurality of suspension boards with a circuit, and a support frame that integrally supports the plurality of suspension boards with a circuit, and each of the plurality of suspension boards with a circuit includes a first insulating layer, a first laminated structure formed on one surface of the first insulating layer, and a second laminated structure formed on another surface of the first insulating layer, wherein the first laminated structure includes a conductor layer, the second laminated structure includes a conductive support substrate, and a connection terminal electrically connected to the conductor layer and electrically insulated from the support substrate, the connection terminal has a surface exposed at the other surface, a laminate is formed of the first laminated structure, the first insulating layer and the second laminated structure, and a portion of the laminate including the connection terminal has a thickness smaller than thickness of portions of the support frame positioned on both sides of the connection terminal.

In this suspension board assembly sheet with a circuit, the plurality of suspension boards with a circuit are integrally supported at the support frame. In each suspension board with a circuit, the first and second laminated structures are respectively formed on the one surface and the other surface of the first insulating layer. The laminate is formed of the first laminated structure, the first insulating layer and the second laminated structure. The conductor layer is included in the first laminated structure, and the support substrate and the connection terminal are included in the second laminated structure. The surface of the connection terminal is exposed at the other surface of the first insulating layer.

Here, a portion of the laminate including the connection terminal has a thickness smaller than the thickness of portions of the support frame positioned on both sides of the connection terminal. Therefore, when the suspension board with a circuit comes into contact with another member, the portion of the support frame comes into contact with another member, and therefore, the likelihood that the surface of the connection terminal of the laminate comes into contact with another member is reduced. Thus, the likelihood of contamination or damage at the connection terminal can be reduced.

(9) According to yet another aspect of the present invention, a method of manufacturing a suspension board with a circuit includes the steps of forming a first laminated structure on one surface of a first insulating layer, and forming a second laminated structure on another surface of the first insulating layer, wherein the step of forming the first laminated structure includes forming a conductor layer, the step of forming the second laminated structure includes forming a conductive support substrate, and a connection terminal electrically connected to the conductor layer and electrically insulated from the support substrate, the connection terminal has a surface exposed at another surface, a laminate is formed of the first laminated structure, the first insulating layer and the second laminated structure, and a first portion of the laminate including the connection terminal has a thickness smaller than thickness of second and third portions of the laminate including portions on both sides of the connection terminal.

According to this method of manufacturing the suspension board with a circuit, the first and second laminated structures are respectively formed on the one surface and the other surface of the first insulating layer. The laminate is formed of the first laminated structure, the first insulating layer and the second laminated structure. The conductor layer is included in the first laminated structure, and the support substrate and the connection terminal are included in the second laminated structure. The surface of the connection terminal is exposed at the other surface of the first insulating layer.

Here, the first portion of the laminate including the connection terminal has a thickness smaller than the thickness of the second and third portions of the laminate including portions on both sides of the connection terminal. Therefore, when the suspension board with a circuit comes into contact with another member, the second and third portions of the laminate come into contact with another member, and therefore, the likelihood that the surface of the connection terminal of the first portion of the laminate comes into contact with another member is reduced. Thus, the likelihood of contamination or damage at the connection terminal can be reduced.

(10) According to yet another aspect of the present invention, a method of manufacturing a suspension board assembly sheet with a circuit includes the steps of forming a plurality of suspension boards with a circuit according to one aspect of the present invention and a support frame integrally supports the plurality of suspension boards with a circuit, and winding the suspension board assembly sheet with a circuit around a roll.

According to this method of manufacturing the suspension board assembly sheet with a circuit, the suspension board assembly sheet with a circuit that includes the above-mentioned plurality of suspension boards with a circuit and the support frame that integrally supports the plurality of suspension boards with a circuit is formed. Further, the suspension board assembly sheet with a circuit is wound around the roll.

In each suspension board with a circuit, the first and second laminated structures are respectively formed on the one surface and the other surface of the first insulating layer. The laminate is formed of the first laminated structure, the first insulating layer and the second laminated structure. The conductor layer is included in the first laminated structure, and the support substrate and the connection terminal are included in the second laminated structure. The surface of the connection terminal is exposed at the other surface of the first insulating layer.

Here, the first portion of the laminate including the connection terminal has a thickness smaller than the thickness of the second and third portions of the laminate including portions on both sides of the connection terminal. Therefore, the suspension board assembly sheet with a circuit is wound around the roll, so that the one suspension board with a circuit and the other suspension board with a circuit are vertically stacked. Even in such a case, the second and third portions of the one suspension board with a circuit come into contact with another suspension board with a circuit, and therefore, the likelihood that the surface of the connection terminal of the one suspension board with a circuit comes into contact with another suspension board with a circuit is reduced. Thus, the likelihood of contamination or damage at the connection terminal can be reduced.

(11) According to yet another aspect of the present invention, a method of manufacturing a suspension board assembly sheet with a circuit includes the steps of forming the suspension board assembly sheet with a circuit according to another aspect of the present invention, and winding the suspension board assembly sheet with a circuit around a roll.

According to this method of manufacturing the suspension board assembly sheet with a circuit, the above-mentioned suspension board assembly sheet with a circuit is formed. Further, the suspension board assembly sheet with a circuit is wound around the roll.

In the suspension board assembly sheet with a circuit, the plurality of suspension boards with a circuit are integrally supported at the support frame. In each suspension board with a circuit, the first and second laminated structures are respectively formed on the one surface and the other surface of the first insulating layer. The laminate is formed of the first laminated structure, the first insulating layer and the second laminated structure. The conductor layer is included in the first laminated structure, and the support substrate and the connection terminal are included in the second laminated structure. The surface of the connection terminal is exposed at the other surface of the first insulating layer.

Here, a portion of the laminate including the connection terminal has a thickness smaller than the thickness of portions of the support frame positioned on both sides of the connection terminal. Therefore, the suspension board assembly sheet with a circuit is wound around the roll, so that the one suspension board with a circuit and another suspension board with a circuit are vertically stacked. Even in such a case, the two support frames come into contact with each other, and therefore, the likelihood that the surface of the connection terminal of the one suspension board with a circuit comes into contact with another suspension board with a circuit is reduced. Thus, the likelihood of contamination or damage at the connection terminal can be reduced.

Other features, elements, characteristics, and advantages of the present invention will become more apparent from the following description of preferred embodiments of the present invention with reference to the attached drawings.

DESCRIPTION OF THE PREFERRED EMBODIMENTS

[1] First Embodiment

A printed circuit board and a method of manufacturing the printed circuit board according to the first embodiment of the present invention will be described below with reference to drawings. A suspension board used for an actuator in a hard disc drive as the printed circuit board according to the first embodiment of the present invention will be described below.

(1) Configuration of Suspension Board

Figure 1:
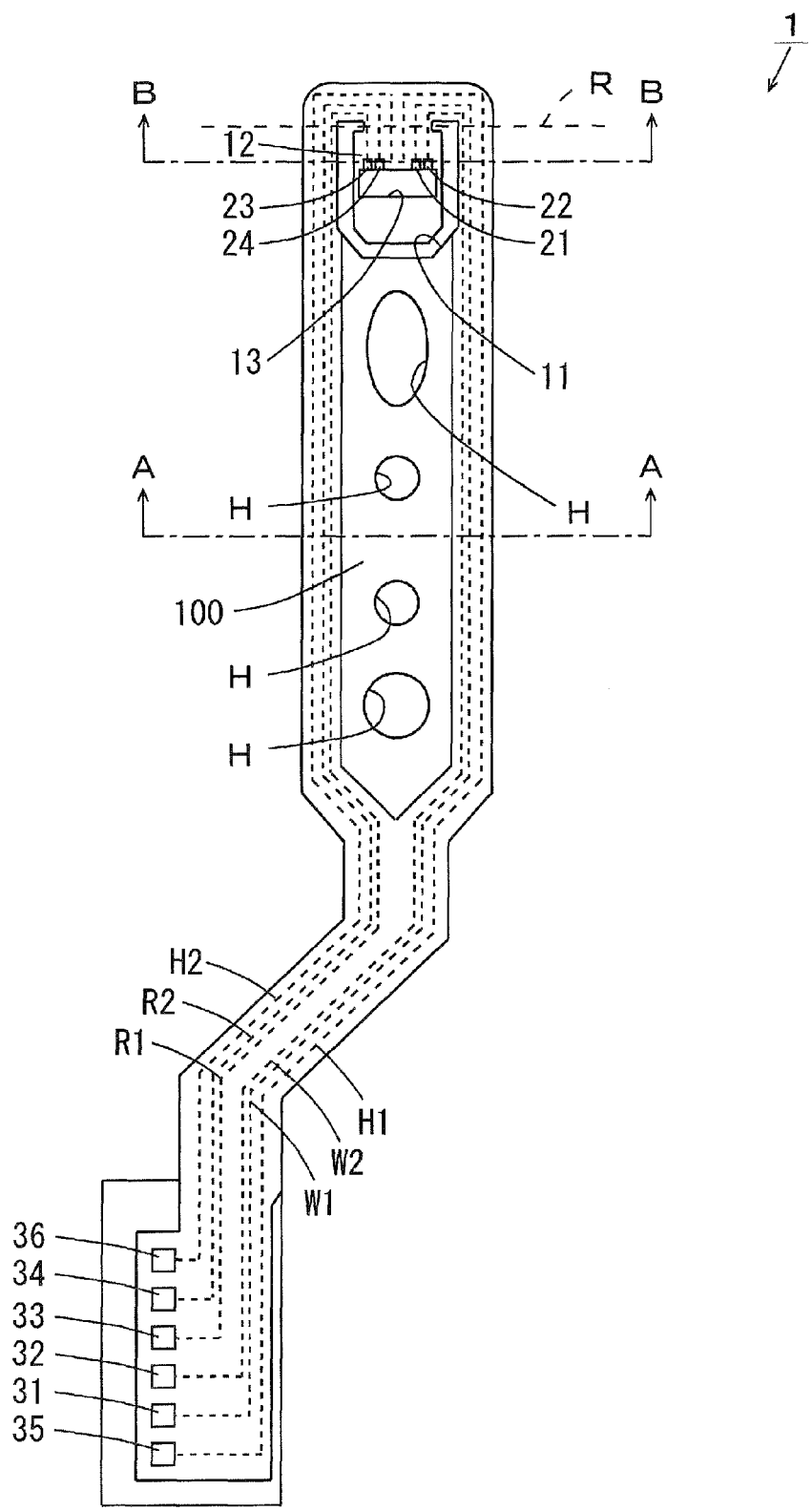
FIG. 1 is a top view of a suspension board according to a first embodiment of the present invention.

FIG. 1 is a top view of the suspension board according to the first embodiment of the present invention. As shown in FIG. 1, the suspension board 1 has a suspension body 100 formed of a metallic long-sized support substrate. As indicated by the dotted lines, write wiring traces W1, W2, read wiring traces R1, R2 and heat-assisted wiring traces H1, H2 are formed on the upper surface of the suspension body 100.

A magnetic head supporting portion (hereinafter referred to as a tongue) 12 is provided by forming a U-shaped opening 11 at the tip end of the suspension body 100. The tongue 12 is bent along the broken line R to form a predetermined angle with the suspension body 100. A rectangular opening 13 is formed at the tongue 12.

Four connection terminals 21, 22, 23, 24 are formed at the upper surface of the tongue 12 at the one end of the suspension body 100. Further, two connection terminals 25, 26 (see below-mentioned FIG. 2(*b*)) are formed at the lower surface of the tongue 12 at the one end of the suspension body 100. In FIG. 1, the connection terminals 25, 26 at the lower surface of the tongue 12 are not shown.

In the present embodiment, a head slider (not shown) has a magnetic head at its upper surface. A heat-assisted device such as a laser diode is attached to the lower surface of the head slider. At the time of writing information into a magnetic disc by the magnetic head, the magnetic disc is heated by the heat-assisted device. Thus, the density of the information written into the magnetic disc can be improved.

The head slider is inserted into the opening 13 of the tongue 12. Thus, the terminals of the magnetic head at the upper surface of the head slider are connected to the connection terminals 21 to 24 at the upper surface of the tongue 12, and the terminals of the heat-assisted device at the lower surface of the head slider are connected to the connection terminals 25, 26 at the lower surface of the tongue 12. In the present embodiment, each of the connection terminals 21 to 26 is rectangular.

Six connection terminals 31, 32, 33, 34, 35, 36 are formed at the upper surface of the other end of the suspension body 100. An electric circuit such as a preamplifier is connected to the connection terminals 31 to 34. A power supply circuit for the heat-assisted device is connected to the connection terminals 35, 36. The connection terminals 21 to 26 of the tongue 12 and the connection terminals 31 to 36 at the other end of the suspension body 100 are respectively electrically connected by the write wiring traces W1, W2, the read wiring traces R1, R2 and the heat-assisted wiring traces H1, H2. Further, a plurality of holes H are formed at the suspension body 100.

The suspension board 1 is provided at a hard disc device. An electric current flows through the pair of the write wiring traces W1, W2 at the time of writing information into the magnetic disc. The write wiring trace W1 and the write wiring trace W2 constitute a differential signal line pair that transmits a differential write signal. Further, an electric current flows through the pair of read wiring traces R1, R2 at the time of reading information from the magnetic disc. The read wiring trace R1 and the read wiring trace R2 constitute a differential signal line pair that transmits a differential read signal.

Figure 2:
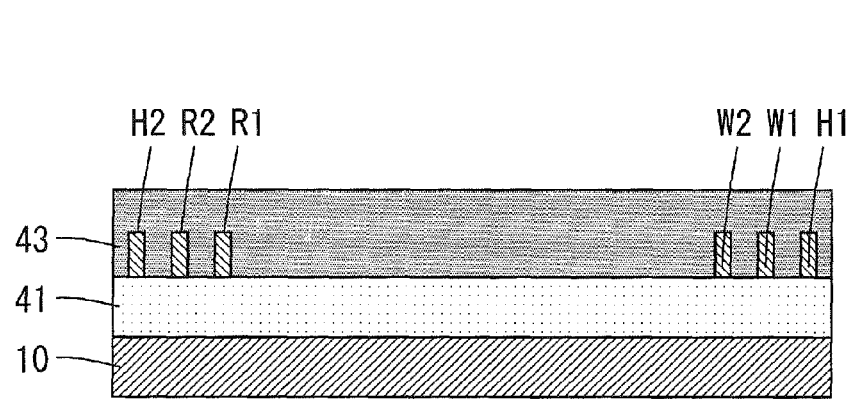
FIGS. 2(a) and 2(b) are cross sectional views of the suspension board of FIG. 1.
Figure 2:
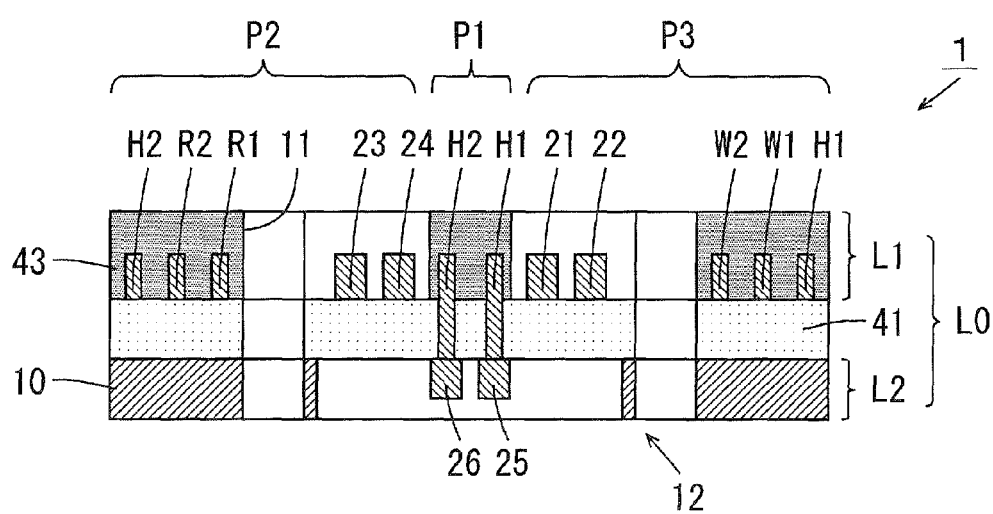

Next, details of the connection terminals 21 to 26 of the suspension board 1 and their peripheral portions will be described. FIGS. 2(*a*) and 2(*b*) are cross sectional views of the suspension board 1 of FIG. 1. FIG. 2(*a*) shows a cross sectional view taken along the line A-A of the suspension board 1 of FIG. 1, and FIG. 2(*b*) shows a cross sectional view taken along the line B-B of the suspension board 1 of FIG. 1.

As shown in FIG. 2(*a*), an insulating layer 41 made of polyimide, for example, is formed on the metallic support substrate 10 made of a stainless steel, for example. The write wiring traces W1, W2, the read wiring traces R1, R2 and the heat-assisted wiring traces H1, H2 are formed on the insulating layer 41 in parallel with each other at intervals.

The write wiring traces W1, W2 and the heat-assisted wiring trace H1 extend along one lateral side of the insulating layer 41. The heat-assisted wiring trace H1 is arranged outside of the write wiring traces W1, W2. The read wiring traces R1, R2 and the heat-assisted wiring trace H2 extend along the other lateral side of the insulating layer 41. The heat-assisted wiring trace H2 is arranged outside of the read wiring traces R1, R2.

A coating layer 43 made of polyimide, for example, is formed on the insulating layer 41 to cover the write wiring traces W1, W2, the read wiring traces R1, R2 and the heat-assisted wiring traces H1, H2. The connection terminals 21 to 24 are exposed from the coating layer 43.

The write wiring traces W1, W2 and the heat-assisted wiring trace H1 that extend along the one lateral side of the insulating layer 41 are bent inward at the one end of the suspension body 100 of FIG. 1, are further bent towards the tongue 12 and extend to the tongue 12. Similarly, the read wiring traces R1, R2 and the heat-assisted wiring trace H2 that extend along the other lateral side of the insulating layer 41 are bent inward at the one end of the suspension body 100, are further bent towards the tongue 12 and extend to the tongue 12.

The write wiring traces W1, W2 and the read wiring traces R1, R2 on the tongue 12 are respectively connected to the connection terminals 21 to 24 at the upper surface of the tongue 12. As shown in FIG. 2(*b*), the heat-assisted wiring traces H1, H2 on the tongue 12 penetrate the insulating layer 41 and are respectively connected to the connection terminals 25, 26 at the lower surface of the tongue 12. The surfaces of the connection terminals 25, 26 are exposed at the lower surface of the insulating layer 41.

A laminated structure L1 is formed of the write wiring traces W1, W2, the read wiring traces R1, R2, the heat-assisted wiring traces H1, H2, the connection terminals 21 to 24 and the coating layer 43 that are laminated at the upper surface of the insulating layer 41. A laminated structure L2 is formed of the connection terminals 25, 26 and the support substrate 10 that are laminated at the lower surface of the insulating layer 41. A laminate L0 is formed of the laminated structure L1, the insulating layer 41 and the laminated structure L2.

Hereinafter, a portion of the laminate L0 including the connection terminals 25, 26 is referred to as a first portion P1, portions of the laminate L0 including portions on both sides of the connection terminals 25, 26 are respectively referred to as second and third portions P2, P3. In the present embodiment, the connection terminals 25, 26 has a thickness smaller than the thickness of the support substrate 10. Therefore, the first portion P1 of the laminate L0 has a thickness smaller than the thickness of the second and third portions P2, P3.

(2) Assembly Sheet

Figure 3:
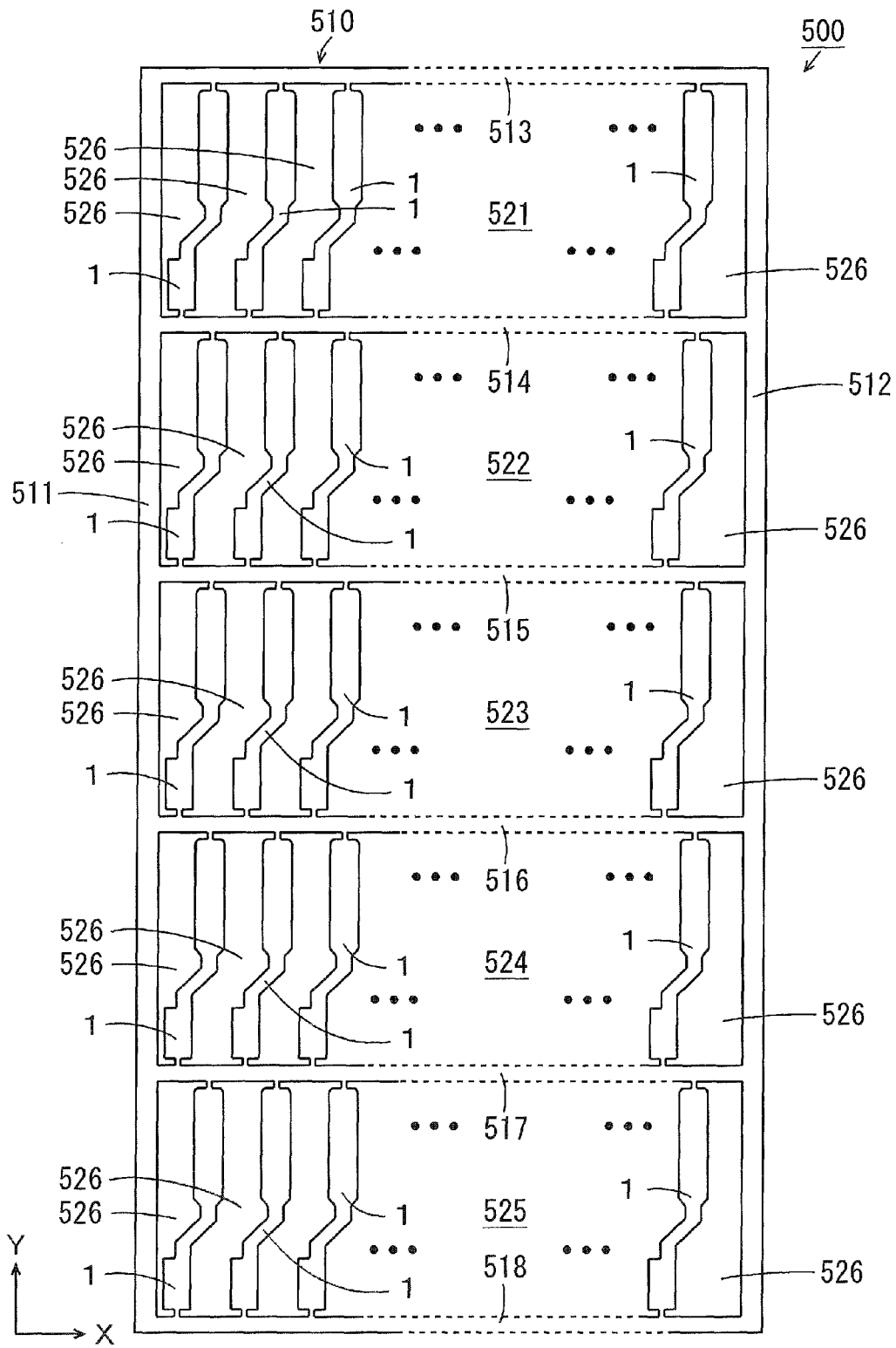
FIG. 3 is a top view of an assembly sheet.
Figure 4:
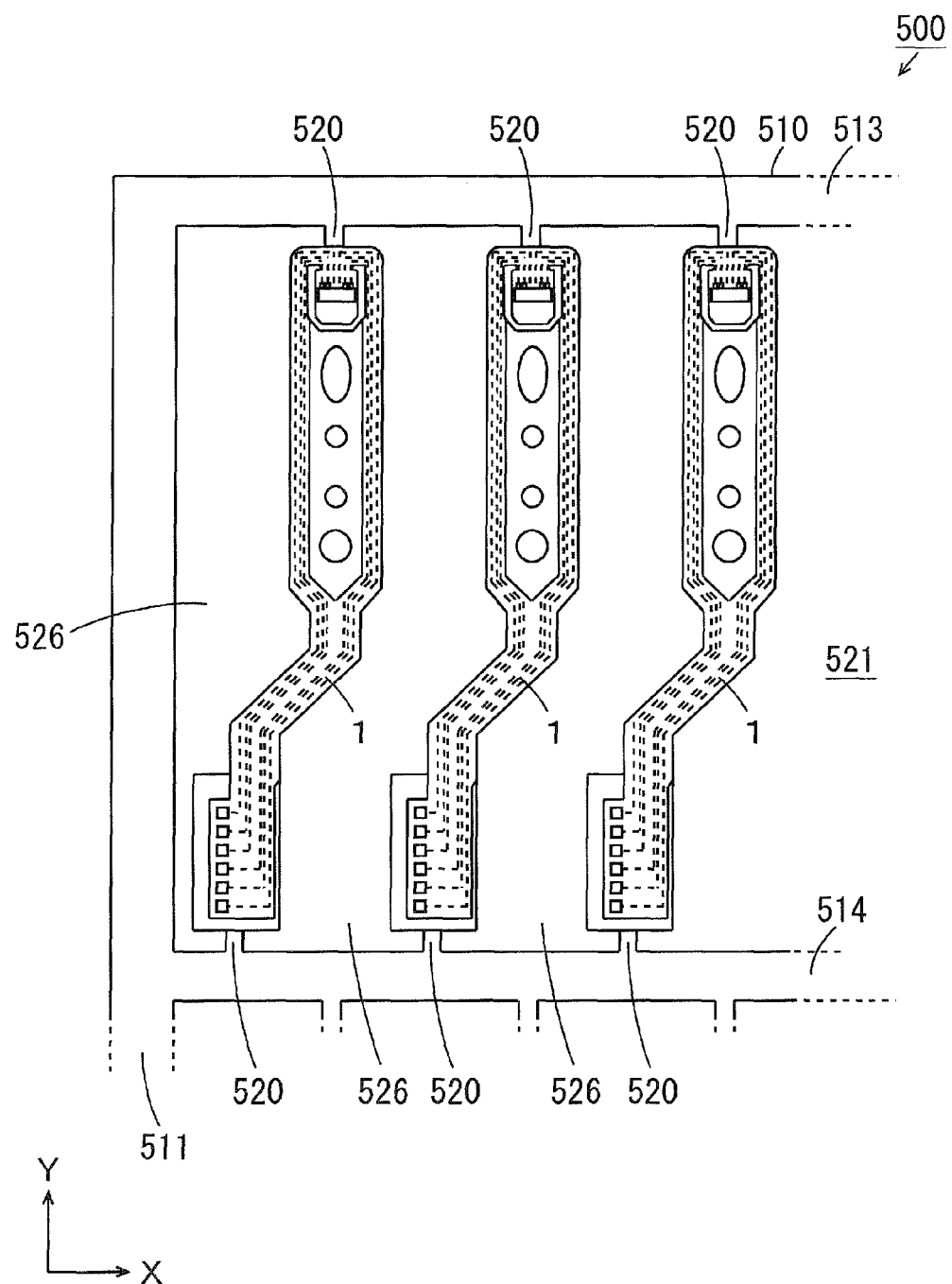
FIG. 4 is a partially enlarged top view of the assembly sheet of FIG. 3.

The plurality of suspension boards 1 are formed on a long-sized suspension board assembly sheet with a circuit (hereinafter referred to as an assembly sheet) using a roll-to-roll system. FIG. 3 is a top view of the assembly sheet. Further, FIG. 4 is a partially enlarged top view of the assembly sheet 500 of FIG. 3. The assembly sheet 500 is fabricated of a metallic long-sized support substrate. In FIGS. 3 and 4, and below-mentioned FIG. 14, two directions that are orthogonal to each other are defined as the X direction and the Y direction as indicated by the arrows X, Y. In the present example, the X direction and the Y direction are parallel to a horizontal plane.

As shown in FIG. 3, the assembly sheet 500 has a rectangular outer shape, and includes a support frame 510 and the plurality of long-sized suspension boards 1. The support frame 510 is made of a pair of side frames 511, 512 and a plurality of end frames 513, 514, 515, 516, 517, 518.

The side frames 511, 512 are opposite to each other and extend in the Y direction. The end frames 513 to 518 are formed to respectively extend in the X direction that are orthogonal to the pair of side frames 511, 512, and to connect between the pair of side frames 511, 512. The end frames 513 to 518 are arranged in the Y direction at equal intervals from the one end to the other end of the pair of side frames 511, 512. Thus, a plurality of (five in the present example) rectangular regions 521, 522, 523, 524, 525 partitioned by the side frames 511, 512 and the end frames 513 to 518 are formed.

The plurality of suspension boards 1 are provided to extend in the Y direction and be arranged in the X direction in the rectangular regions 521 to 525. At the assembly sheet 500, separation grooves 526 are formed along the outer peripheral edge of each suspension board 1. As shown in FIG. 4, both ends in the Y direction of each suspension board 1 are coupled to the support frame 510 via coupling portions 520.

In this manner, in each rectangular region 521 to 525 of FIG. 3, the plurality of suspension boards 1 are supported in alignment at the support frame 510. The coupling portions 520 are cut off after the assembly sheet 500 is manufactured, so that each suspension board 1 is separated from the support frame 510.

(3) Manufacturing Method of Suspension Board

The manufacturing method regarding one of the plurality of suspension boards 1 formed on the assembly sheet 500 will be described below. FIGS. 5(a) to 8(c) are schematic diagrams showing the manufacturing steps of the suspension board 1 of FIG. 1. The plurality of suspension boards 1 are manufactured using the roll-to-roll system.

Figure 5A:
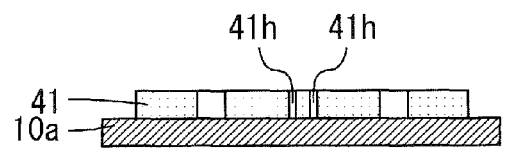
FIGS. 5(a) to 5(c) are schematic diagrams showing the manufacturing step of the suspension board of FIG. 1.
Figure 5A:
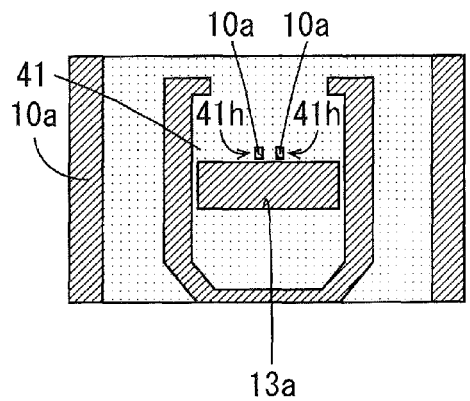
Figure 5B:
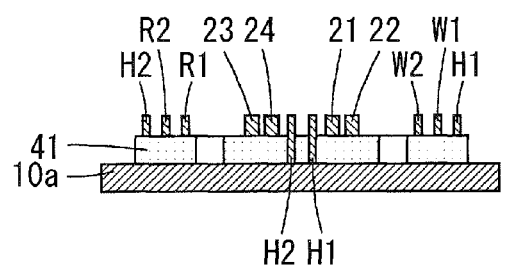
Figure 5B:
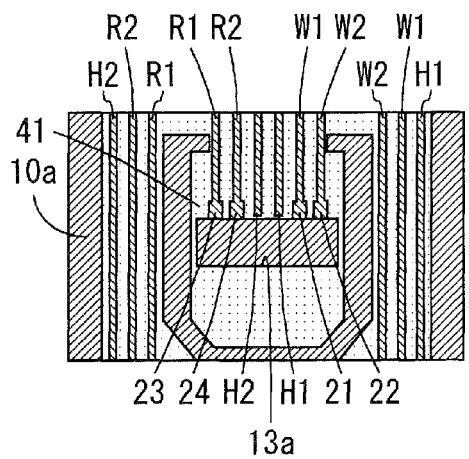
Figure 5C:
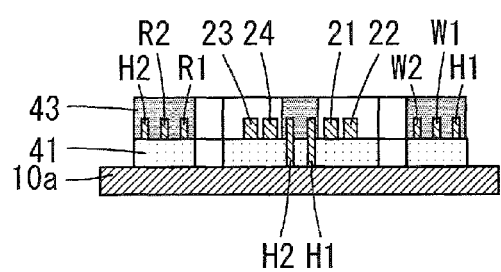
Figure 5C:
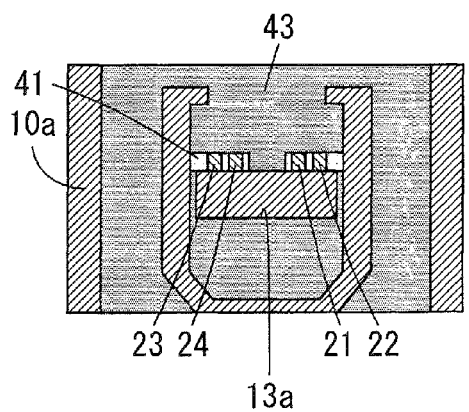
Figure 6:
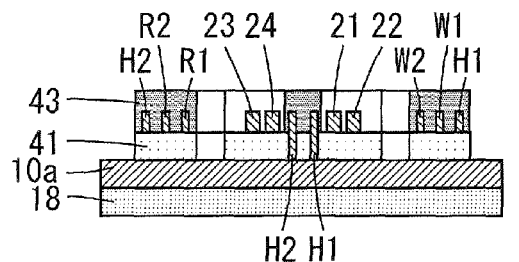
FIGS. 6(a) to 6(c) are schematic diagrams showing the manufacturing step of the suspension board of FIG. 1.
Figure 6:
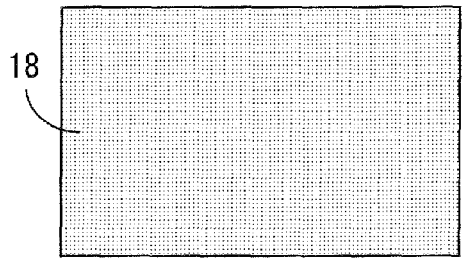
Figure 6:
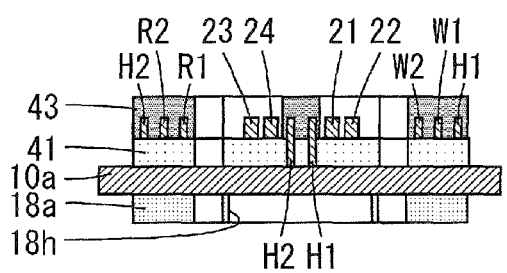
Figure 6:
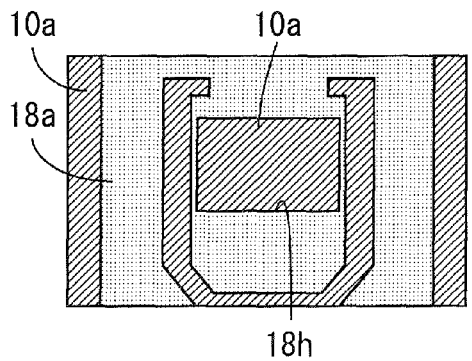
Figure 6:
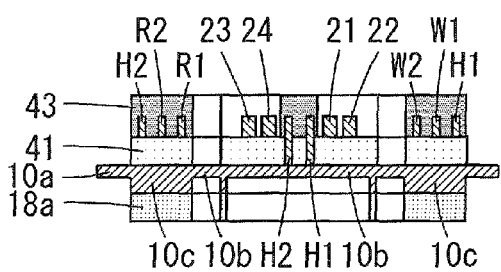
Figure 6:
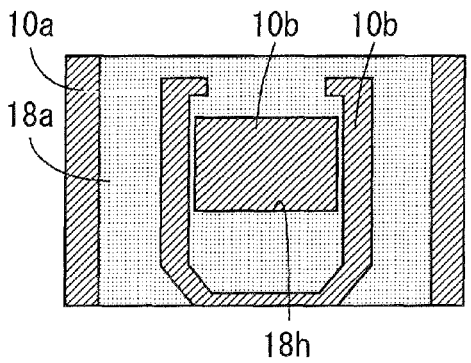
Figure 7:
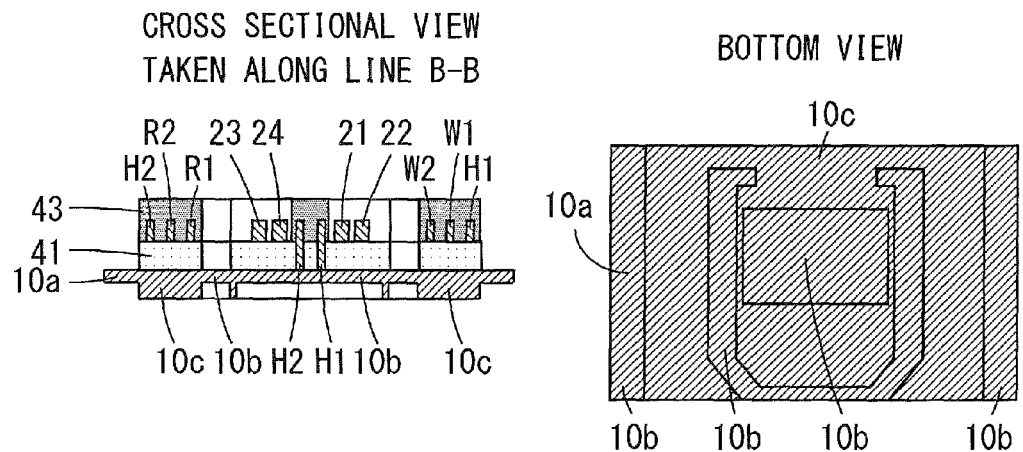
FIGS. 7(a) to 7(c) are schematic diagrams showing the manufacturing step of the suspension board of FIG. 1.
Figure 7:
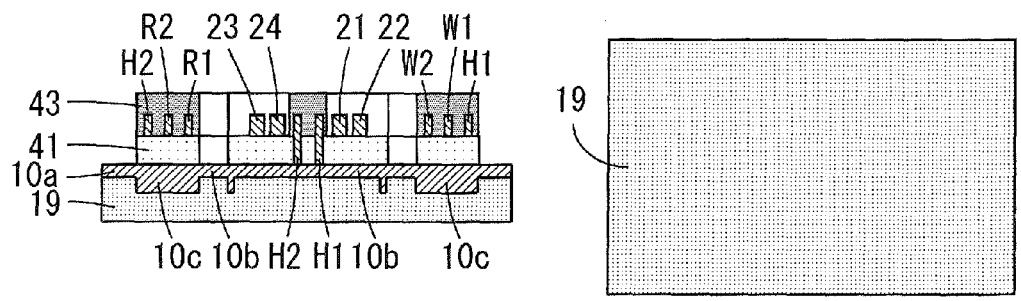
Figure 7:
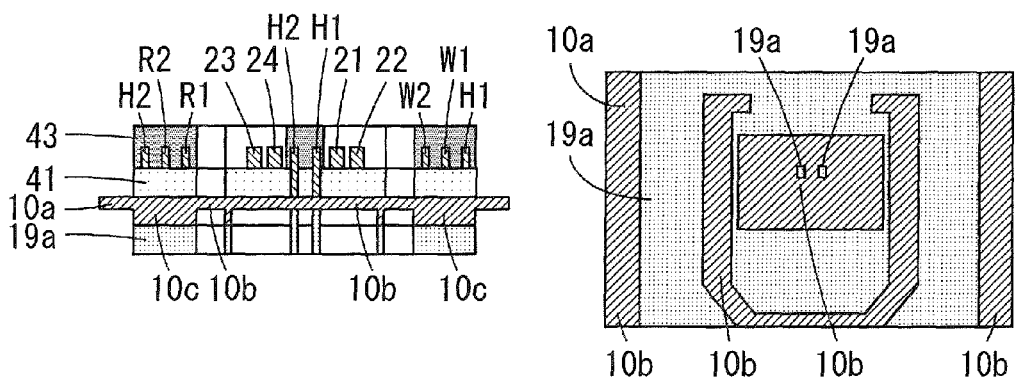
Figure 8:
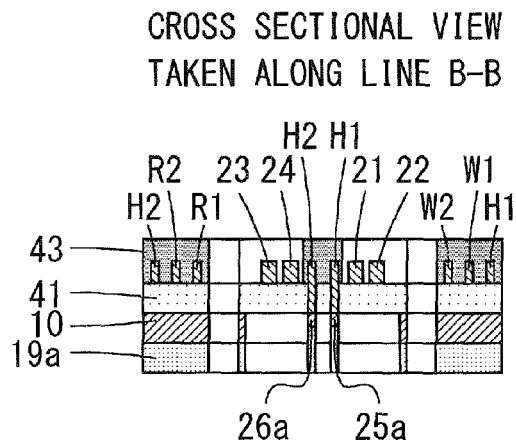
FIGS. 8(a) to 8(c) are schematic diagrams showing the manufacturing step of the suspension board of FIG. 1.
Figure 8:
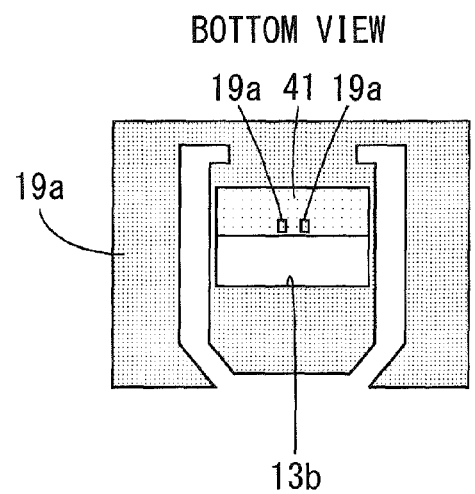
Figure 8:
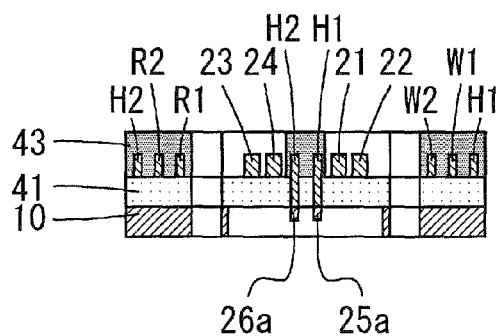
Figure 8:
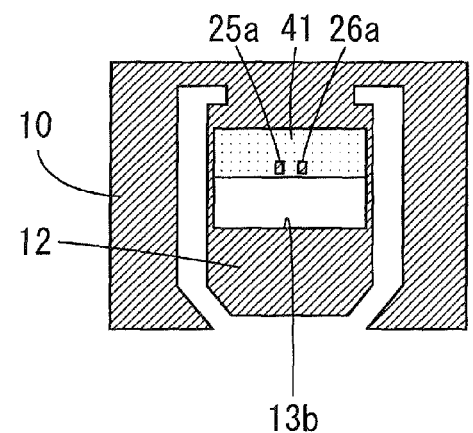
Figure 8:
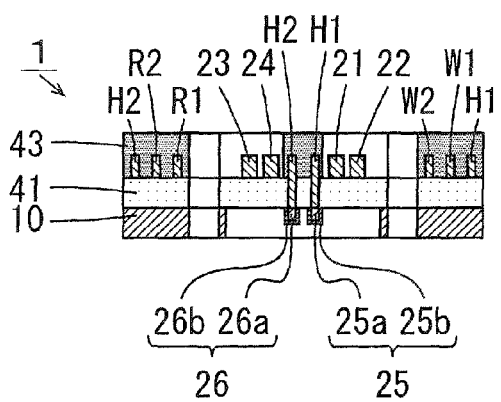
Figure 8:
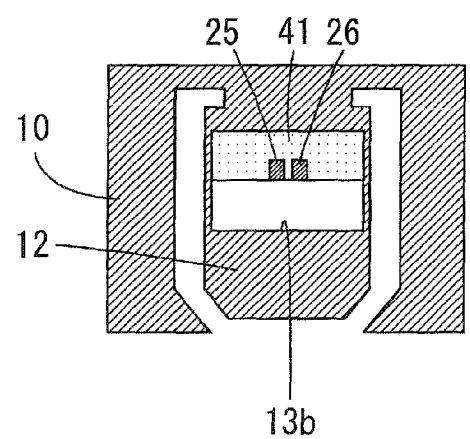

In FIGS. 5(a) to 5(c), cross sectional views taken along the line B-B of the suspension board 1 of FIG. 1 are shown in the left, and top views of the tongue 12 of the suspension board 1 of FIG. 1 and its surroundings are shown in the right. In FIGS. 6(a) to 8(c), cross sectional views taken along the line B-B of the suspension board 1 of FIG. 1 are shown in the left, and the tongue 12 of the suspension board 1 of FIG. 1 and its surroundings are shown in the right. In the top views of FIGS. 5(a) to 5(c) and the bottom views of FIGS. 6(a) to 8(c), the hatching or the dotted pattern that is the same as the hatching or dotted pattern applied to each member of the cross sectional views is applied in order to facilitate understanding of the configuration.

First, as shown in FIG. 5(a), an insulating layer 41 made of polyimide is formed on a support substrate 10a made of a stainless steel. The support substrate 10a has a thickness of not less than 10 μm and not more than 50 μm, for example. The insulating layer 41 has a thickness of not less than 5 μm and not more than 15 μm, for example. Here, the insulating layer 41 is formed in the same shape as the suspension board 1 of FIG. 1. Further, a rectangular opening 13a is formed at the insulating layer 41, and a plurality of (two in the example of FIG. 5(a)) openings 41h are formed. Thus, part of the support substrate 10a is exposed from the opening 13a and the plurality of openings 41h.

Next, as shown in FIG. 5(b), the write wiring traces W1, W2, the read wiring traces R1, R2 and the heat-assisted wiring traces H1, H2 having predetermined patterns are formed on the insulating layer 41, and the support substrate 10a exposed from the opening 41h. Simultaneously, the connection terminals 21 to 24 are respectively formed at the ends of the write wiring traces W1, W2, and the read wiring traces R1, R2.

The write wiring traces W1, W2, the read wiring traces R1, R2 and the heat-assisted wiring traces H1, H2 are made of copper, for example. In the present example, nickel plating and gold plating are sequentially respectively performed on the write wiring traces W1, W2 and the read wiring traces R1, R2, whereby the connection terminals 21 to 24 are formed.

The write wiring traces W1, W2, the read wiring traces R1, R2 and the heat-assisted wiring traces H1, H2 have a thickness of not less than 6 μm and not more than 18 μm, for example. Further, the write wiring traces W1, W2, the read wiring traces R1, R2 and the heat-assisted wiring traces H1, H2 have a width of not less than 8 μm and not more than 50 μm, for example.

Further, the distance between the write wiring traces W1, W2 and the distance between the read wiring traces R1, R2 are respectively not less than 8 μm and not more than 100 μm, for example. Similarly, the distance between the write wiring trace W1 and the heat-assisted wiring trace H1, and the distance between the read wiring trace R2 and the heat-assist wiring trace H2 are respectively not less than 8 μm and not more than 100 μm, for example.

Subsequently, as shown in FIG. 5(c), a coating layer 43 made of polyimide is formed on the insulating layer 41 to cover the write wiring traces W1, W2, the read wiring traces R1, R2 and the heat-assisted wiring traces H1, H2. The coating layer 43 has a thickness of not less than 2 μm and not more than 10 μm, for example. The connection terminals 21 to 24 are exposed from the coating layer 43.

Next, as shown in FIG. 6(a), a resist film 18 is formed at the lower surface of the support substrate 10a using a photosensitive dry film resist or the like, for example. Subsequently, as shown in FIG. 6(b), the resist film 18 is developed using a development solution such as sodium carbonate after being exposed in a predetermined pattern, whereby an etching resist 18a is formed.

Here, the etching resist 18a is formed in a region of the support substrate 10a that overlaps with the coating layer 43 of FIG. 5(c). Further, the etching resist 18a has a rectangular opening 18h that surrounds portions of the support substrate 10a that overlap with the openings 41h of the insulating layer 41 of FIG. 5(a) and the opening 13a of FIG. 5(c).

Thereafter, as shown in FIG. 6(c), half-etching is performed on the support substrate 10a using a ferric chloride solution and a cupric chloride solution as an etching solution. Thus, a portion of the support substrate 10a exposed from the etching resist 18a is made thinner than the remaining portion of the support substrate 10a. Hereinafter, a portion of the support substrate 10a in which the thickness is reduced due to the half-etching of the support substrate 10a is referred to as a thin portion 10b, and the remaining portion of the support substrate 10a is referred to as a thick portion 10c. The thin portion 10b preferably has a thickness smaller than the thickness of the thick portion 10c by not less than 0.1 μm to 3 μm.

Next, as shown in FIG. 7(a), the etching resist 18a is removed. Subsequently, as shown in FIG. 7(b), a resist film 19 is formed at the lower surface of the support substrate 10a using the photosensitive dry film resist or the like, for example. Thereafter, as shown in FIG. 7(c), the resist film 19 is developed using a development solution such as sodium carbonate after being exposed in a predetermined pattern, whereby an etching resist 19a is formed. Here, the etching resist 19a is formed on the thick portion 10c, and part of the thin portion 10b that overlaps with the openings 41h of FIG. 5(a).

Then, as shown in FIG. 8(a), the support substrate 10a is etched using a ferric chloride solution and a cupric chloride solution as the etching solution. Thus, parts of the thick portion 10c and the thin portion 10b exposed from the etching resist 19a are removed. Thus, the support substrate 10 is formed.

Here, a rectangular opening 13b is formed at the support substrate 10 to communicate with the opening 13a of FIG. 5(c). The opening 13a and the opening 13b communicate with each other, so that the opening 13 of FIG. 1 is formed. Further, the remaining thin portions 10b at the insulating layer 41 become rectangular insular portions 25a, 26a. The insular portions 25a, 26a are respectively electrically connected to the heat-assisted wiring traces H1, H2 through the openings 41h of the insulating layer 41.

In the step of FIG. 8(a), parts of the thick portion 10c and the thin portion 10b exposed from the etching resist 19a are removed, whereby portions correspond to the separation grooves 526 of FIG. 3 are removed from the support substrate 10a. Thus, the support frame 510 that includes the side frames 511, 512, the end frames 513 to 518 and the plurality of coupling portions 520 is formed.

Subsequently, as shown in FIG. 8(b), the etching resist 19a is removed. Thereafter, as shown in FIG. 8(c), metal layers 25b, 26b are formed to respectively cover the insular portions 25a, 26a. The metal layers 25b, 26b have a thickness of from 0.1 μm to 3 μm, for example. The metal layers 25b, 26b include nickel and gold (Au). In the present example, nickel plating and gold plating as the metal layers 25b, 26b are sequentially formed at the insular portions 25a, 26a.

The connection terminal 25 is constituted by the insular portion 25a and the metal layer 25b, and the connection terminal 26 is constituted by the insular portion 26a and the metal layer 26b. Thus, the suspension board 1 is completed, and the assembly sheet 500 that supports the suspension boards 1 is completed.

At the time point of the step of FIG. 8(c), each completed suspension board 1 is coupled to the assembly sheet 500 by the coupling portions 520. The coupling portions 520 are cut off, so that the plurality of suspension boards 1 can be separated from the assembly sheet 500.

(4) Effects

In the suspension board 1 according to the present embodiment, the write wiring traces W1, W2, the read wiring traces R1, R2, the heat-assisted wiring traces H1, H2 and the connection terminals 21 to 24 are formed at the upper surface of the insulating layer 41. Further, the coating layer 43 is formed at the upper surface of the insulating layer 41 to cover the write wiring traces W1, W2, the read wiring traces R1, R2 and the heat-assisted wiring traces H1, H2. The connection terminals 25, 26 and the support substrate 10 are formed at the lower surface of the insulating layer 41.

The connection terminals 25, 26 have a thickness smaller than the thickness of the support substrate 10. Therefore, when the lower surface of the suspension board 1 comes into contact with another member, a portion of the support substrate 10 comes into contact with another member, and therefore, the likelihood that the surfaces of the connection terminals 25, 26 come into contact with another member is reduced.

Figure 9:
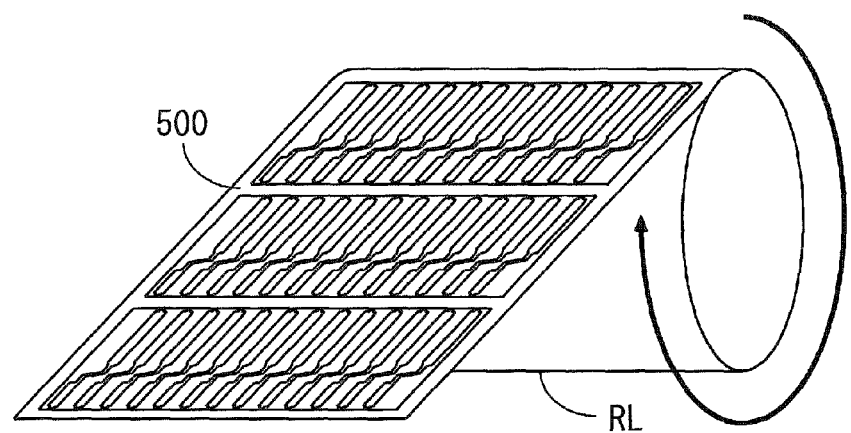
FIG. 9 is a perspective view showing the assembly sheet being wound around a roll.
Figure 10:
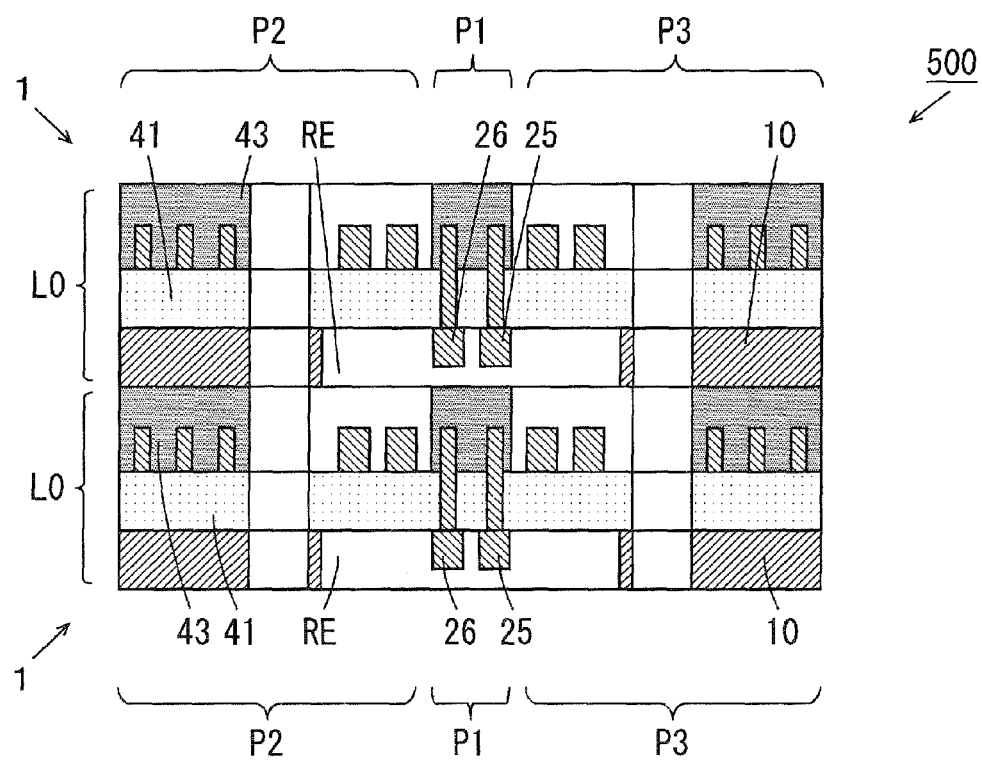
FIG. 10 is a cross sectional view showing part of the plurality of suspension boards in the assembly sheet of FIG. 9.

FIG. 9 is a perspective view showing the assembly sheet 500 being wound around a roll. FIG. 10 is a cross sectional view showing part of the plurality of suspension boards 1 in the assembly sheet 500 of FIG. 9. FIG. 10 corresponds to a cross sectional view taken along the line B-B of the suspension board 1 of FIG. 1.

As shown in FIGS. 9 and 10, when the assembly sheet 500 is wound around the roll RL, parts of the support substrate 10 at the lower surface of the upper suspension board 1 come into contact with the upper surface of the coating layer 43 of the lower suspension board 1. Even in such a case, the connection terminals 25, 26 at the lower surface of the upper suspension board 1 do not come into contact with the upper surface of the lower suspension board 1.

In this manner, the thickness of the first portion P1 of the laminate L0 is reduced to be smaller than that of the second and third portions P2, P3, whereby a recess RE is formed between the second portion P2 and the third portion P3 of the laminated structure L2. Further, the surfaces of the connection terminals 25, 26 are positioned in the recess RE. Thus, the likelihood that the surfaces of the connection terminals 25, 26 come into contact with another member can be reduced. As a result, the likelihood of contamination or damage at the connection terminals 25, 26 can be reduced. Further, the metal layers 25b, 26b can be prevented from being stripped from the insular portions 25a, 26a of the connection terminals 25, 26. In the present embodiment, it is possible to reduce the thickness of the first portion P1 of the laminate L0 to be smaller than that of the second and third portions P2, P3 of the laminate L0 without providing another member at the support substrate 10.

While the thickness of the support substrate 10 is evenly formed in the above-mentioned embodiment, the invention is not limited to this. For example, the thickness of portions of the support substrates 10 on both sides of the connection terminals 25, 26 may be formed to be larger than that of the connection terminals 25, 26.

[2] Second Embodiment (1) Configuration of Suspension Board

Figure 11:
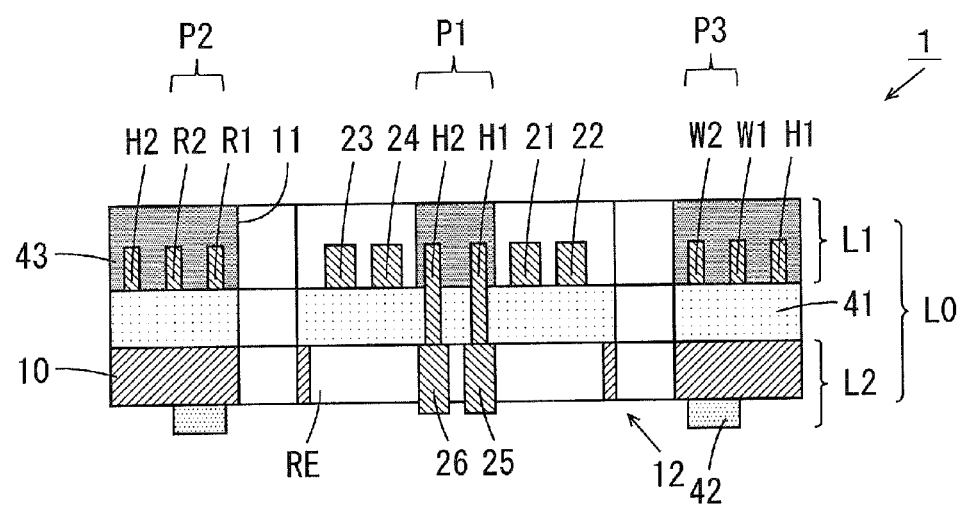
FIG. 11 is a cross sectional view of the suspension board according to the second embodiment.

Regarding a suspension board according to the second embodiment, difference from the suspension board 1 according to the first embodiment will be described. FIG. 11 is a cross sectional view of the suspension board according to the second embodiment. FIG. 11 corresponds to a cross sectional view taken along the line B-B of the suspension board 1 of FIG. 1.

As shown in FIG. 11, in the present embodiment, two support layers 42 are provided at the lower surface of a support substrate 10 to be opposite to each other with a tongue 12 sandwiched therebetween. The support layers 42 are formed of polyimide, for example. The support layers 42 may be formed of another resin or may be formed of metal.

In the present embodiment, a laminated structure L2 includes the support layers 42. Connection terminals 25, 26 have a thickness smaller than the total thickness of the support substrate 10 and the support layer 42. Therefore, a first portion P1 of the laminate L0 has a thickness smaller than the thickness of second and third portions P2, P3.

In the present embodiment, the connection terminals 25, 26 may have a thickness larger than the thickness of the support substrate 10. Alternatively, the connection terminals 25, 26 may have a thickness substantially equal to the thickness of the support substrate 10. In the example of FIG. 10, the connection terminals 25, 26 have a thickness larger than the thickness of the support substrate 10 by the thickness of metal layers 25b, 26b (FIG. 8(c)).

(2) Manufacturing Method of Suspension Board

FIGS. 12(a) to 13(c) are schematic diagrams showing the manufacturing steps of the suspension board 1 according to the second embodiment. In FIGS. 12(a) to 13(c), cross sectional views of the suspension board 1 that correspond to the cross sectional view taken along the line B-B of FIG. 1 are shown in the left, and bottom views of the tongue 12 and its surroundings of the suspension board 1 are shown in the right. The same hatching or dotted patterns applied to each member of the cross sectional views is applied to the members of the bottom views of FIGS. 12(a) to 13(c) in order to facilitate understanding of the configuration.

The step of forming an insulating layer 41, write wiring traces W1, W2, read wiring traces R1, R2 and a coating layer 43 on a support substrate 10a in the present embodiment is similar to the step in the first embodiment (FIGS. 5(a) to 5(c)).

Figure 12A:
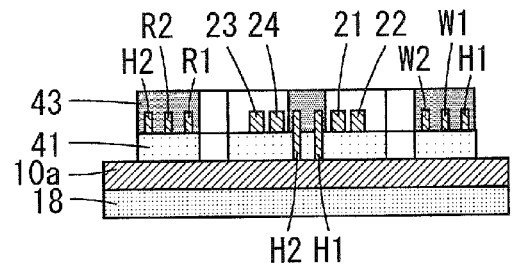
FIGS. 12(a) to 12(c) are schematic diagrams showing the manufacturing step of the suspension board according to the second embodiment.
Figure 12A:
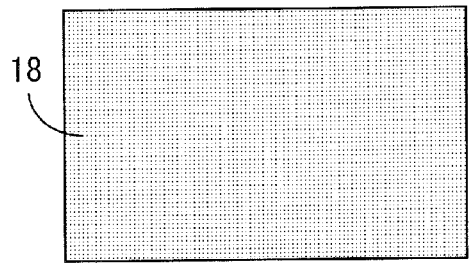
Figure 12B:
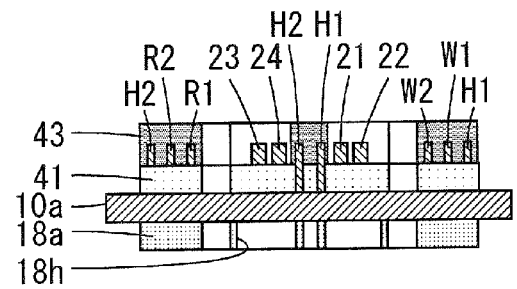
Figure 12B:
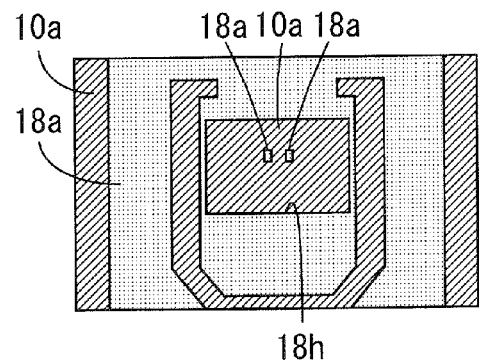

As shown in FIG. 12(a), a resist film 18 is formed at the lower surface of a support substrate 10a using a photosensitive dry film resist or the like, for example, after the step of FIG. 5(c). Subsequently, as shown in FIG. 12(b), the resist film 18 is developed using a development liquid such as sodium carbonate after the resist film 18 is exposed in a predetermined pattern, whereby an etching resist 18a is formed.

Here, the etching resist 18a is formed in a region of the support substrate 10a that overlaps with the coating layer 43 of FIG. 5(c). Further, the etching resist 18a has a rectangular opening 18h that surrounds portions of the support substrate 10a that overlap with openings 41h of an insulating layer 41 of FIG. 5(a) and an opening 13a of FIG. 5(c). Further, the etching resist 18a is formed on portions of the support substrate 10a that overlap with the openings 41h of the insulating layer 41 in the opening 18h.

Figure 12C:
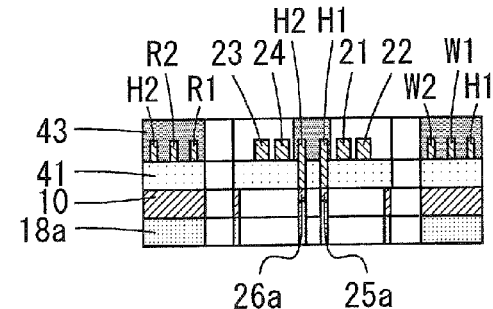
Figure 12C:
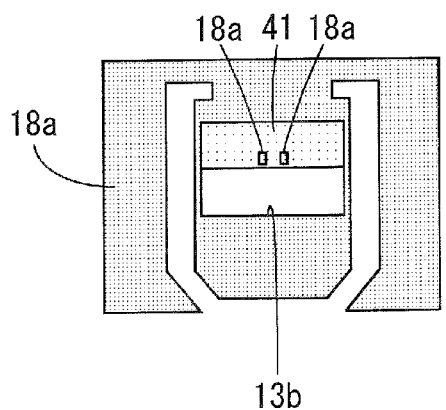
Figure 13:
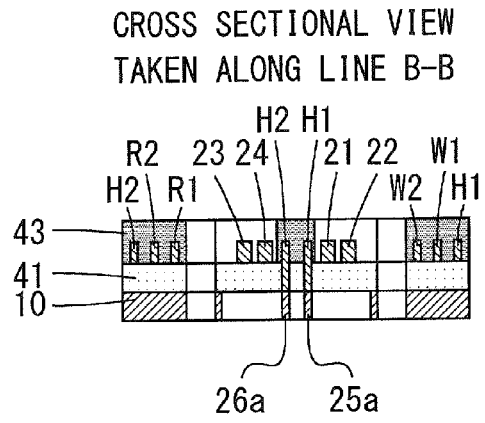
FIGS. 13(a) to 13(c) are schematic diagrams showing the manufacturing step of the suspension board according to the second embodiment.
Figure 13:
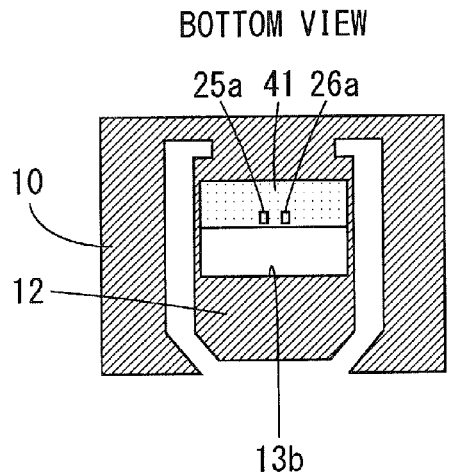
Figure 13:
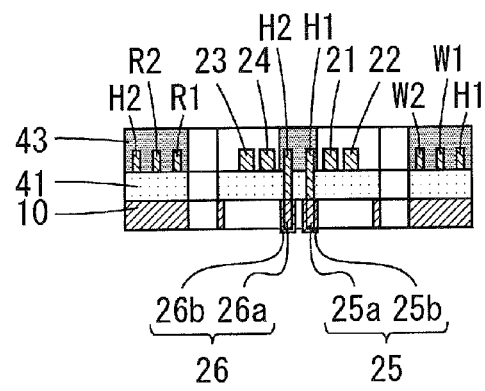
Figure 13:
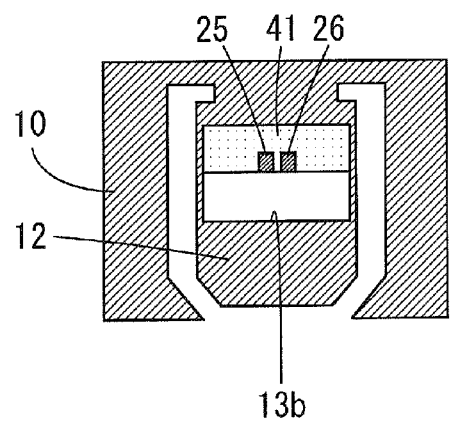
Figure 13:
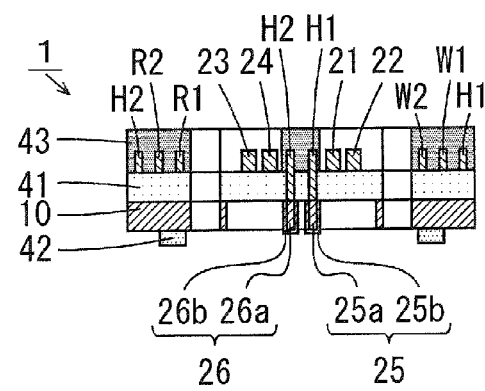
Figure 13:
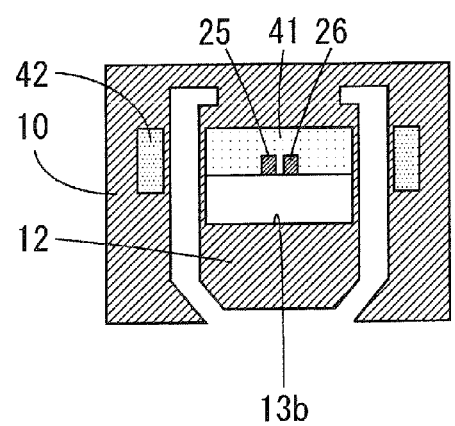

Next, as shown in FIG. 12(c), the support substrate 10a is etched using a ferric chloride solution and a cupric chloride solution as an etching solution. Thus, portions of the support substrate 10a that are exposed from the etching resist 18a are removed. Thus, the support substrate 10 is formed.

Here, the rectangular opening 13b is formed at the support substrate 10 to communicate with the opening 13a of FIG. 5(c). The opening 13a and the opening 13b communicate with each other, so that an opening 13 of FIG. 1 is formed. Further, portions of the support substrate 10 that remain at the insulating layer 41 become rectangular insular portions 25a, 26a. The insular portions 25a, 26a are electrically respectively connected to the heat-assisted wiring traces H1, H2 via the openings 41h of the insulating layer 41.

Subsequently, as shown in FIG. 13(a), the etching resist 18a is removed. Thereafter, as shown in FIG. 13(b), the metal layers 25b, 26b are formed to respectively cover the insular portions 25a, 26a. The connection terminals 25, 26 are constituted by the insular portions 25a, 26a and the metal layers 25b, 26b, The metal layers 25b, 26b have a thickness of 0.1 μm to 3 μm, for example. Therefore, the connection terminals 25, 26 have a thickness larger than the thickness of the support substrate 10 by 0.1 μm to 3 μm. Note that, the step of FIG. 13(b) may be omitted. In this case, the connection terminals 25, 26 are respectively constituted by the insular portions 25a, 26a, and have a thickness substantially equal to the thickness of the support substrate 10.

Finally, as shown in FIG. 13(c), the two support layers 42 are formed at the lower surface of the support substrate 10 to be opposite to each other with the tongue 12 sandwiched therebetween. Thus, the suspension board 1 is completed, and the assembly sheet 500 that supports the suspension boards 1 is completed. The step of FIG. 13(c) may be performed before the step of FIG. 13(b).

(3) Modified Example of Second Embodiment

While the support layers 42 are formed at the lower surface of the support substrate 10 of the suspension board 1 in the second embodiment, the invention is not limited to this. The support layers 42 may be formed at other portions of the suspension board 1, or may be formed at the assembly sheet.

Figure 14:
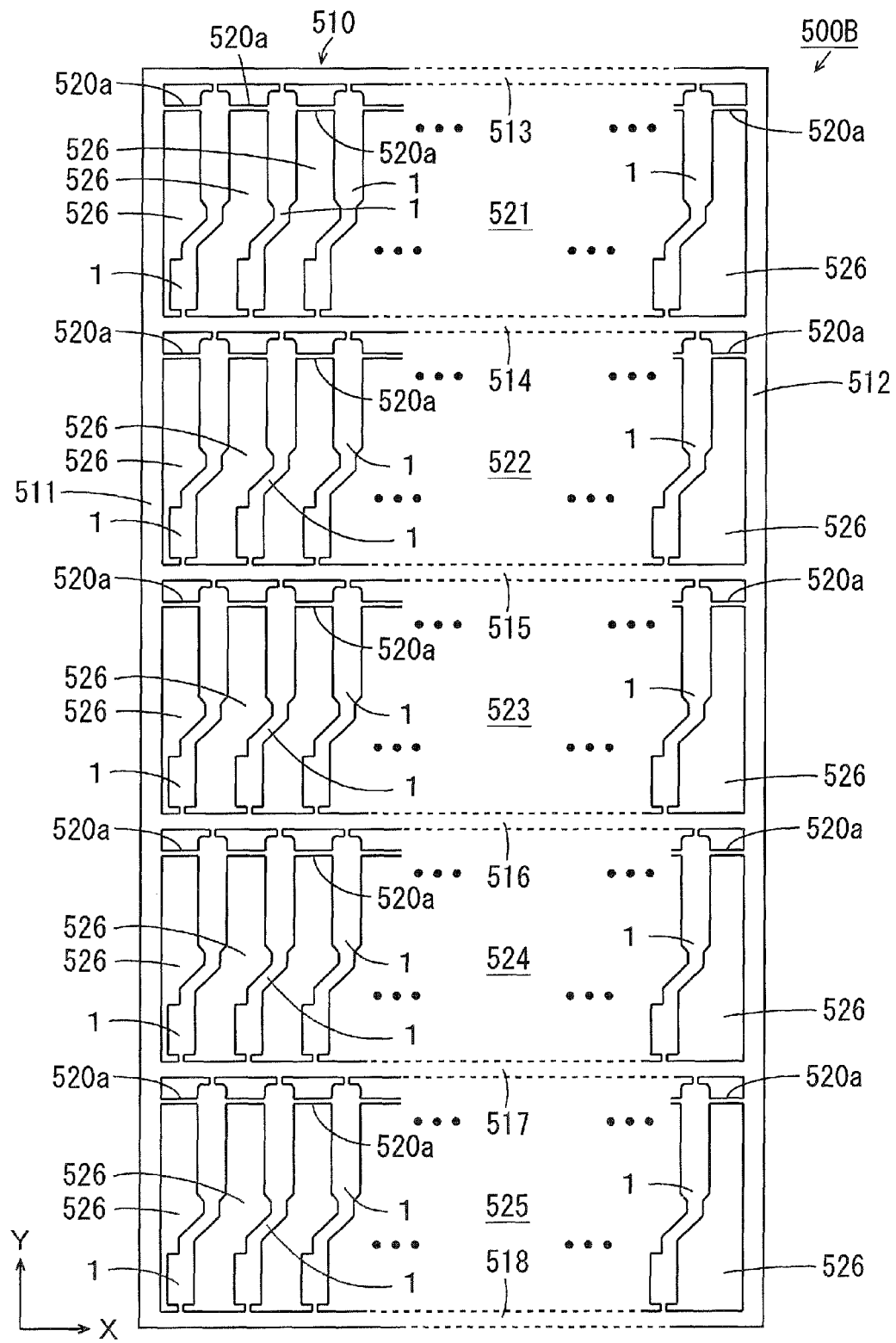
FIG. 14 is a top view of the assembly sheet in a modified example of the second embodiment.

FIG. 14 is a top view of the assembly sheet in the modified example of the second embodiment. An assembly sheet 500B in the modified example of the second embodiment has the similar configuration as the assembly sheet 500 in the first embodiment of FIG. 3 except for the following points. As shown in FIG. 14, in the assembly sheet 500B, the suspension boards 1 at the one end in the X direction are coupled to a side frame 511 by coupling portions 520a. Further, the suspension boards 1 at the other end in the X direction are coupled to a side frame 512 by the coupling portions 520a. Further, the plurality of adjacent suspension boards 1 in the X direction are coupled to each other by the coupling portions 520a.

Figure 15:
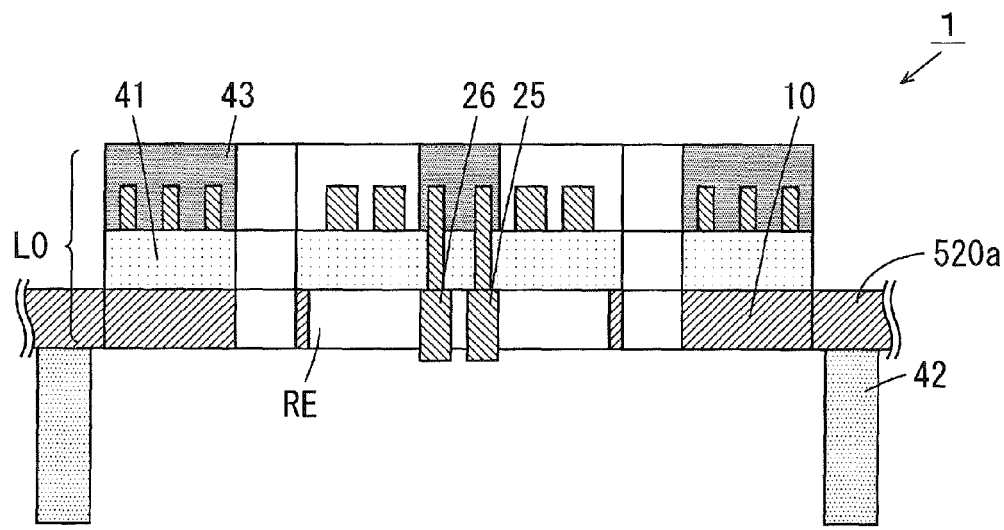
FIG. 15 is a cross sectional view of the suspension board in the modified example of the second embodiment.

FIG. 15 is a cross sectional view of the suspension board 1 in the modified example of the second embodiment. FIG. 15 corresponds to a cross sectional view taken along the line B-B of the suspension board 1 of FIG. 1. The plurality of suspension boards 1 of FIG. 15 are formed on the assembly sheet 500B of FIG. 14. As shown in FIG. 15, in the modified example of the second embodiment, the support layers 42 are not formed at the lower surface of the support substrate 10 of the suspension board 1 but are formed at the lower surface of the coupling portions 520a of the assembly sheet 500B. Portions of the laminate L0 that include the connection terminals 25, 26 have a thickness smaller than the total thickness of the coupling portion 520a and the support layer 42.

(4) Effects

In the suspension board 1 according to the present embodiment, the support layers 42 are provided at the lower surface of the support substrate 10 to be opposite to each other with the tongue 12 sandwiched therebetween. The connection terminals 25, 26 have a thickness smaller than the total thickness of the support substrate 10 and the support layer 42. In this case, a recess RE is formed between the support layers 42 of the second and third portions P2, P3 of the laminated structure L2, and the surfaces of the connection terminals 25, 26 are positioned in the recess RE. Therefore, when the lower surface of the suspension board 1 comes into contact with another member, a portion of the support substrate 10 comes into contact with another member, and therefore, the likelihood that the surfaces of the connection terminals 25, 26 come into contact with another member is reduced.

Figure 16:
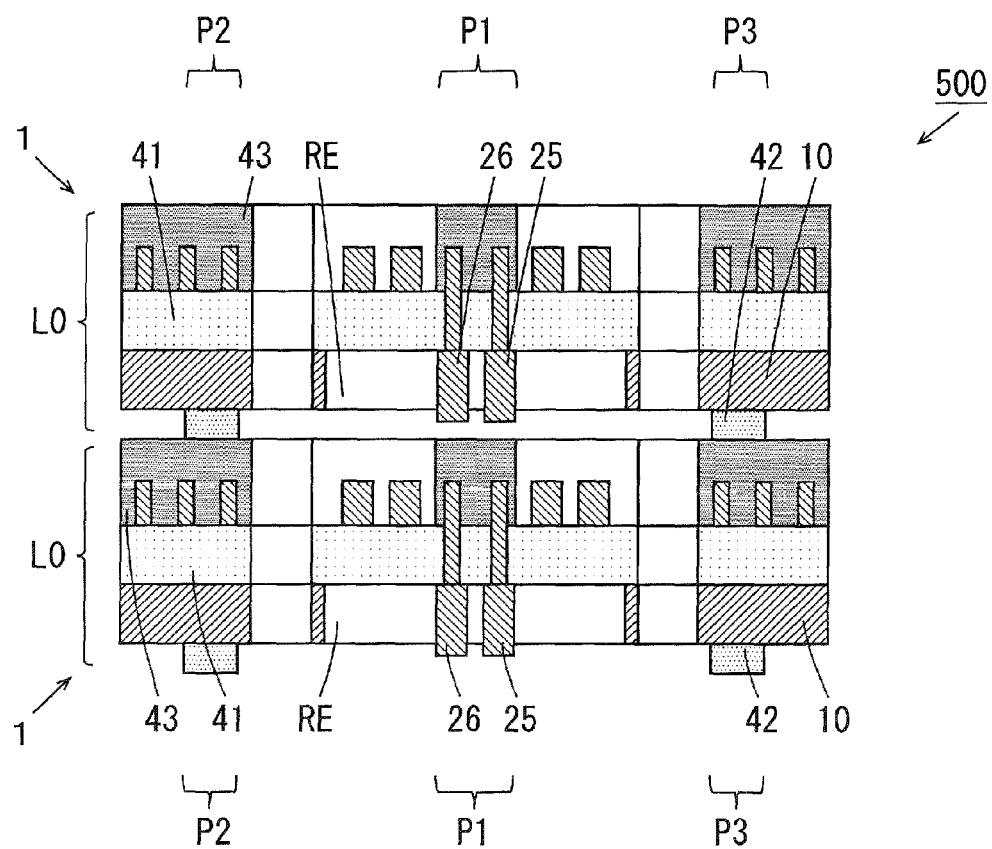
FIG. 16 is a cross sectional view showing part of the plurality of suspension boards formed on the assembly sheet according to the second embodiment.

FIG. 16 is a cross sectional view showing part of the plurality of suspension boards 1 formed on the assembly sheet 500 according to the second embodiment. The assembly sheet 500 of FIG. 16 is wound around a roll RL. FIG. 16 corresponds to a cross sectional view taken along the line B-B of the suspension board 1 of FIG. 1.

As shown in FIG. 16, when the assembly sheet 500 is wound around the roll RL, the support layers 42 at the lower surface of the upper suspension board 1 come into contact with the upper surface of the coating layer 43 of the lower suspension board 1. Even in such a case, the connection terminals 25, 26 at the lower surface of the upper suspension board 1 do not come into contact with the upper surface of the lower suspension board 1.

In this manner, the thickness of the first portion P1 of the laminated structure L0 is reduced to be smaller than that of the second and third portions P2, P3, whereby the likelihood that the surfaces of the connection terminals 25, 26 come into contact with another member can be reduced. As a result, the likelihood of contamination or damage at the connection terminals 25, 26 can be reduced.

When the support layers 42 are formed at the lower surfaces of the coupling portions 520a, the coupling portions 520a come into contact with each other via the support layers 42, and therefore, the likelihood that the surfaces of the connection terminals 25, 26 of the upper suspension board 1 comes into contact with the upper surface of the lower suspension board 1 is reduced. Thus, the likelihood of contamination or damage at the connection terminals 25, 26 can be reduced.

In the present embodiment, it is possible to reduce the thickness of the first portion P1 of the laminate L0 to be smaller than that of the second and third portions P2, P3 of the laminate L0 without adjusting the thickness of the support substrate 10 and the connection terminals 25, 26.

[3] Third Embodiment (1) Configuration of Suspension Board

Figure 17:
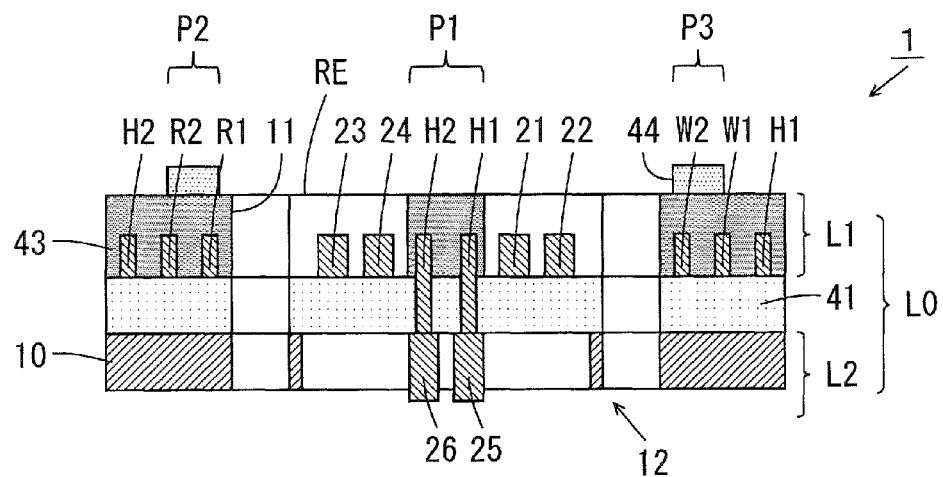
FIG. 17 is a cross sectional view of the suspension board according to the third embodiment.

Regarding a suspension board according to the third embodiment, difference from the suspension board 1 according to the second embodiment will be described. FIG. 17 is a cross sectional view of the suspension board according to the third embodiment. FIG. 17 corresponds to a cross sectional view taken along the line B-B of the suspension board 1 of FIG. 1.

In the present embodiment, two support layers 44 are provided at the upper surface of a coating layer 43 to be opposite to each other with a tongue 12 sandwiched therebetween instead of providing the support layers 42 at the lower surface of the support substrate 10 as shown in FIG. 17. The support layers 44 are formed of polyimide, for example. The support layers 44 may be formed of another resin, or may be formed of metal. In the present embodiment, a laminated structure L1 includes the support layers 44. A first portion P1 of a laminate L0 has a thickness smaller than the thickness of second and third portions P2, P3.

The method of manufacturing the suspension board 1 in the present embodiment is similar to the method of manufacturing the suspension board 1 according to the second embodiment except for the following points. In the present embodiment, in the step of FIG. 5(c), the two support layers 44 are formed at the upper surface of a coating layer 43 to be opposite to each other with a tongue 12 sandwiched therebetween after the coating layer 43 is formed on an insulating layer 41. Further, in the present embodiment, the step of FIG. 13(c) is not performed.

(2) Modified Example of Third Embodiment

While the support layers 44 are formed at the upper surface of the coating layer 43 of the suspension board 1 in the third embodiment, the invention is not limited to this. The support layers 44 may be formed at other portions of the suspension board 1, or may be formed at an assembly sheet. The assembly sheet in the modified example of the third embodiment is similar to the assembly sheet 500B of FIG. 14.

Figure 18:
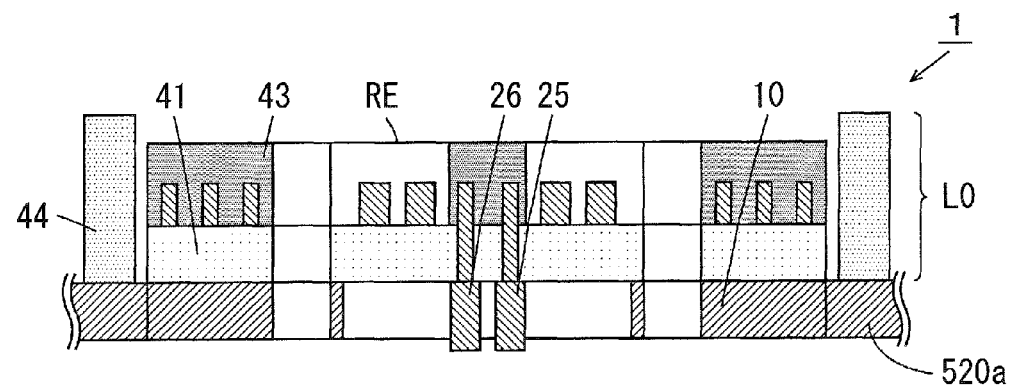
FIG. 18 is a cross sectional view of the suspension board in a modified example of the third embodiment.

FIG. 18 is a cross sectional view of a suspension board 1 in the modified example of the third embodiment. FIG. 18 corresponds to a cross sectional view taken along the line B-B of the suspension board 1 of FIG. 1. The plurality of suspension boards 1 of FIG. 18 are formed at the assembly sheet 500B of FIG. 14. As shown in FIG. 18, in the modified example of the third embodiment, the support layers 44 are not formed at the upper surface of the coating layer 43 of the suspension board 1, but are formed at the upper surfaces of coupling portions 520a of the assembly sheet 500B. Portions of the laminate L0 that include the connection terminals 25, 26 have a thickness smaller than the total thickness of the coupling portion 520a and the support layer 44.

(3) Effects

In the suspension board 1 according to the present embodiment, the support layers 44 are provided at the upper surface of the coating layer 43 to be opposite to each other with the tongue 12 sandwiched therebetween. In this case, a recess RE is formed between the support layers 44 of second and third portions P2, P3 of the laminated structure L1. Thus, when the plurality of suspension boards 1 are stacked, connection terminals 25, 26 of the upper suspension board 1 can be positioned in the recess RE of the lower suspension board 1. Therefore, the connection terminals 25, 26 of the upper suspension board 1 are prevented from coming into contact with the upper surface of the lower suspension board 1.

Figure 19:
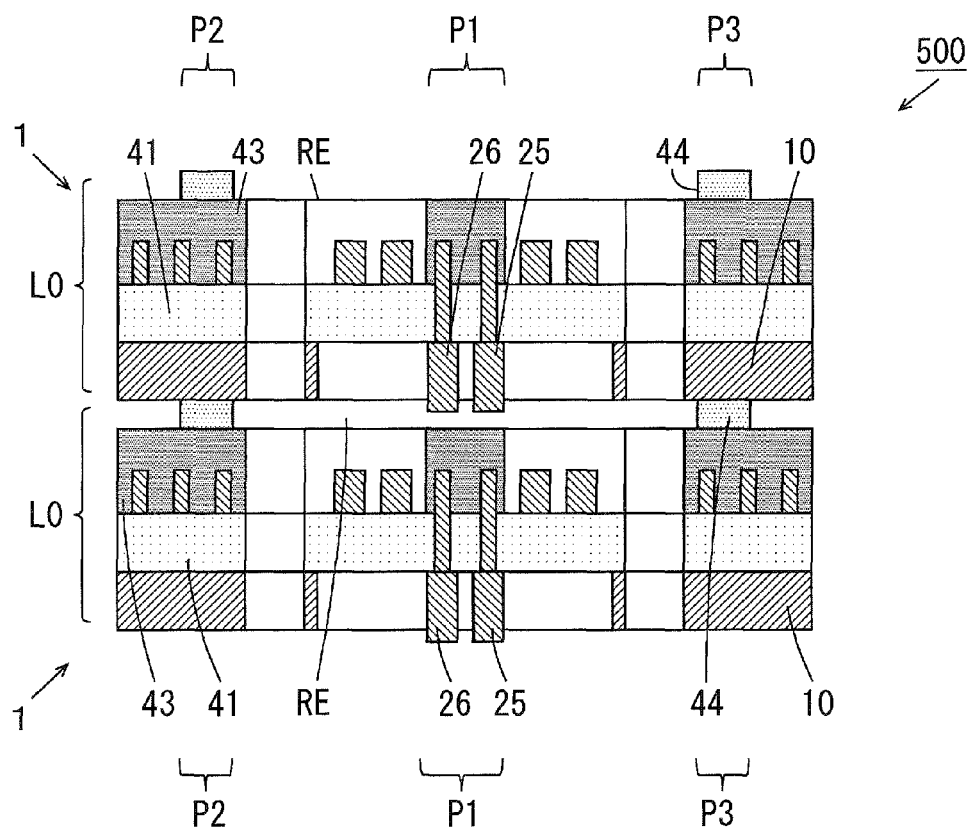
FIG. 19 is a cross sectional view showing part of the plurality of suspension boards formed on the assembly sheet according to the third embodiment.

FIG. 19 is a cross sectional view showing part of the plurality of suspension boards 1 formed on an assembly sheet 500 according to the third embodiment. The assembly sheet 500 of FIG. 19 is wound around a roll RL. FIG. 19 corresponds to a cross sectional view taken along the line B-B of the suspension board 1 of FIG. 1.

As shown in FIG. 19, when the assembly sheet 500 is wound around the roll RL, portions of a support substrate 10 at the lower surface of the upper suspension board 1 come into contact with the support layers 44 at the upper surface of the lower suspension board 1. Even in such a case, connection terminals 25, 26 at the lower surface of the upper suspension board 1 do not come into contact with the upper surface of the lower suspension board 1.

In this manner, the thickness of the first portion P1 of the laminate L0 is reduced to be smaller than that of the second and third portions P2, P3, whereby the likelihood that the surfaces of the connection terminals 25, 26 comes into contact with another member can be reduced. As a result, the likelihood of contamination or damage at the connection terminals 25, 26 can be reduced.

When the support layers 44 are formed at the upper surface of the coupling portion 520a, coupling portions 520a come into contact with each other via the support layer 44, and therefore, the likelihood that the surfaces of the connection terminals 25, 26 of the upper suspension board 1 come into contact with the upper surface of the lower suspension board 1 is reduced. Thus, the likelihood of contamination or damage at the connection terminals 25, 26 can be reduced.

[4] Other Embodiments (1) First Example

Figure 20:
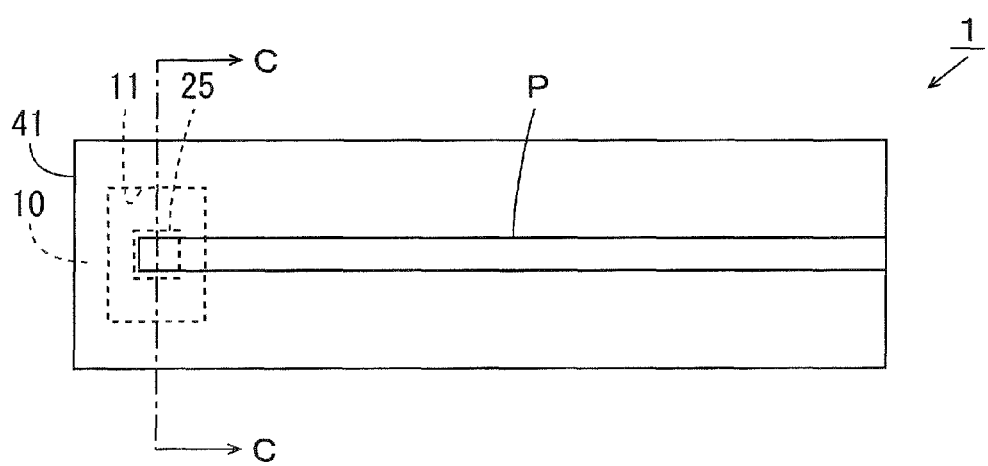
FIG. 20 is a plan view of the suspension board according to a first example of other embodiments.
Figure 21:
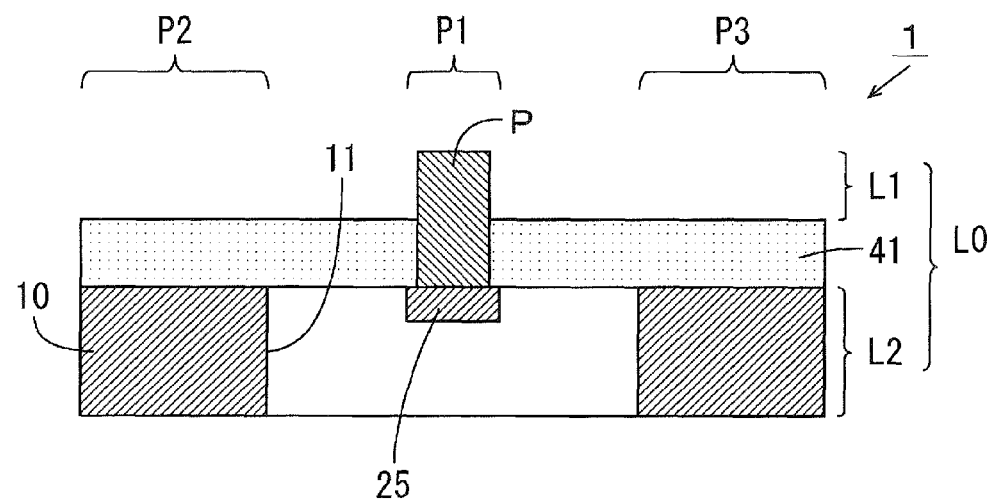
FIG. 21 is a cross sectional view taken along the line C-C of FIG. 20.

While the suspension board 1 has the coating layer 43 in the above-mentioned embodiment, the invention is not limited to this. The suspension board 1 does not have to have the coating layer 43. FIG. 20 is a plan view of a suspension board according to the first example of other embodiments. FIG. 21 is a cross sectional view taken along the line C-C of FIG. 20.

As shown in FIGS. 20 and 21, in the suspension board 1 according to a first example of other embodiments, a wiring trace P is formed on a support substrate 10 via an insulating layer 41. A rectangular opening 11 is formed at the support substrate 10. In the opening 11, a connection terminal 25 is formed at the lower surface of the insulating layer 41. The connection terminal 25 is electrically connected to the wiring trace P, and is electrically insulated from the support substrate 10. The surface of the connection terminal 25 is exposed at the lower surface of the insulating layer 41.

In the present example, a laminated structure L1 is formed of the wiring trace P laminated at the upper surface of the insulating layer 41. A laminated structure L2 is formed of the connection terminal 25 and the support substrate 10 laminated at the lower surface of the insulating layer 41. A laminate L0 is formed of the laminated structure L1, the insulating layer 41 and the laminated structure L2.

Hereinafter, a portion of the laminate L0 that includes the connection terminal 25 is referred to as a first portion P1, and portions of the laminate L0 that include portions on both sides of the connection terminal 25 are referred to as second and third portions P2, P3. The first portion P1 of the laminate L0 has a thickness smaller than the thickness of the second and the third portions P2, P3.

A method of manufacturing the suspension board 1 of the present example is similar to the method of manufacturing the suspension board 1 according to the first embodiment except for the following points. In the present example, in the steps of FIGS. 5(a) and 5(b), the wiring trace P is formed instead of the write wiring traces W1, W2, the read wiring traces R1, R2 and the heat-assisted wiring traces H1, H2. Further, the connection terminals 21 to 24 are not formed. In the step of FIG. 5(c), the coating layer 43 is not formed on the insulating layer 41. In the steps of FIGS. 7(c) to 8(c), the connection terminal 26 is not formed.

Figure 22:
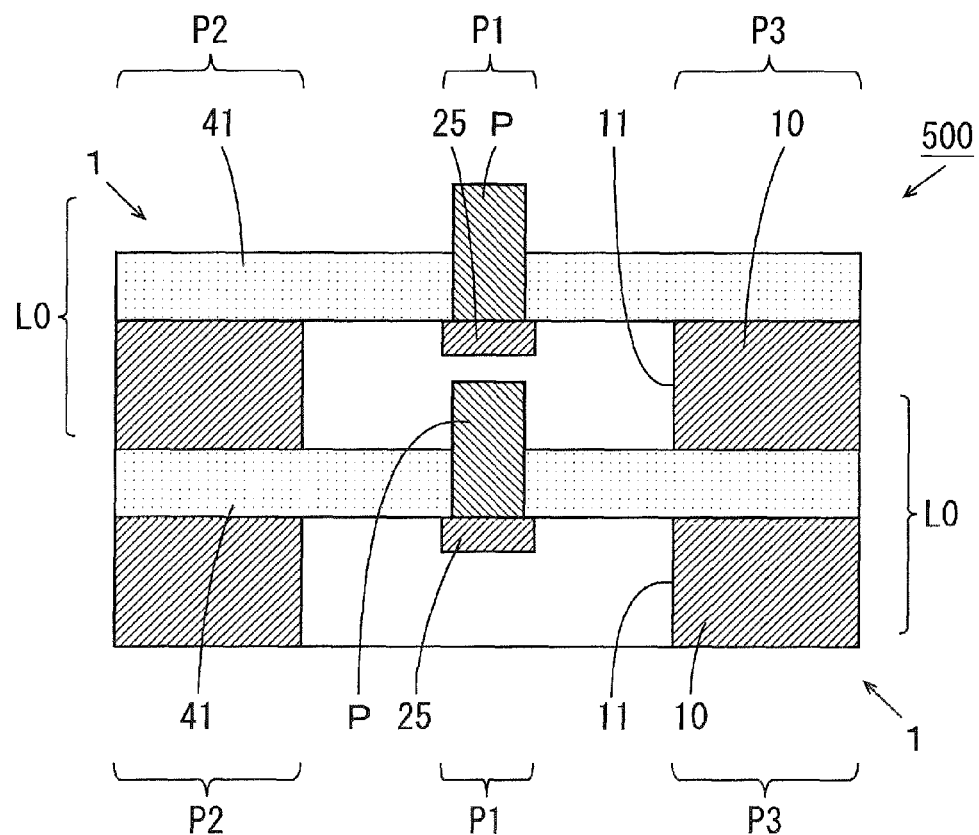
FIG. 22 is a cross sectional view showing part of the plurality of suspension boards formed on the assembly sheet according to the first example of other embodiments.

FIG. 22 is a cross sectional view showing part of the plurality of suspension boards 1 formed on an assembly sheet 500 according to the first example of other embodiments. The assembly sheet 500 of FIG. 22 is wound around a roll RL. FIG. 22 corresponds to a cross sectional view taken along the line C-C of the suspension board 1 of FIG. 20.

As shown in FIG. 22, when the assembly sheet 500 is wound around the roll RL, portions of the support substrate 10 at the lower surface of the upper suspension board 1 come into contact with the upper surface of the insulating layer 41 of the lower suspension board 1. Even in such a case, the connection terminal 25 at the lower surface of the upper suspension board 1 does not come into contact with the upper surface of the lower suspension board 1.

In this manner, the thickness of the first portion P1 of the laminate L0 is reduced to be smaller than that of the second and third portions P2, P3, whereby the likelihood that the surface of the connection terminal 25 comes into contact with another member can be reduced. As a result, the likelihood of contamination or damage at the terminal 25 can be reduced. Further, in the present example, similarly to the first embodiment, it is possible to reduce the thickness of the first portion P1 of the laminate L0 to be smaller than that of the second and third portions P2, P3 of the laminate L0 without providing another member at the support substrate 10.

(2) Second Example

Figure 23:
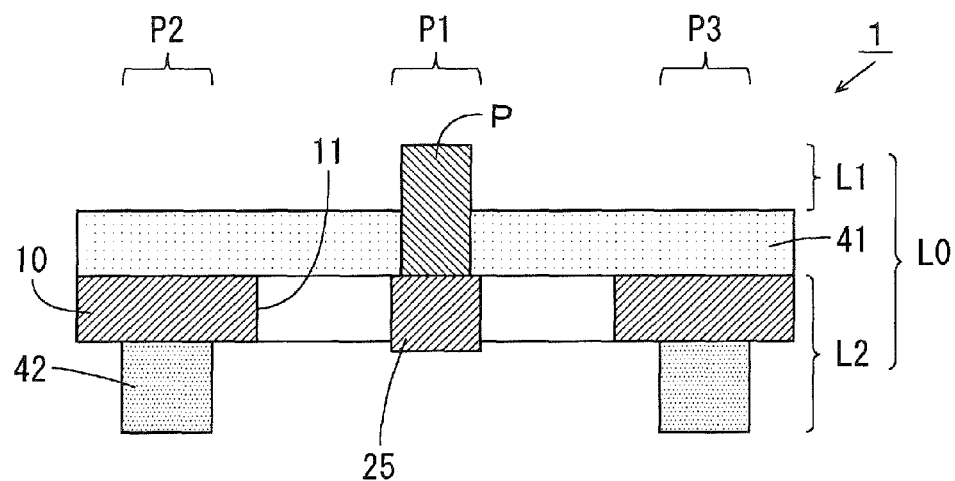
FIG. 23 is a cross sectional view of the suspension board according to the second example of other embodiments.

FIG. 23 is a cross sectional view of a suspension board according to the second example of other embodiments. FIG. 23 corresponds to a cross sectional view taken along the line C-C of FIG. 20. The suspension board 1 according to the second example of other embodiments has the similar configuration to the suspension board 1 according to the first example of other embodiments of FIG. 21 except for the following points.

As shown in FIG. 23, in the suspension board 1 according to the second example of other embodiments, two support layers 42 are provided at the lower surface of a support substrate 10 to be opposite to each other with a wiring trace P sandwiched therebetween. Similarly to the support layer 42 in the second embodiment, the support layers 42 may be formed of resin, or may be formed of metal.

In the present example, a laminated structure L2 includes the support layers 42. A portion of a laminate L0 that includes the one support layer 42 is a second portion P2, and a portion of the laminate L0 that includes the other support layer 42 is a third portion P3. A first portion P1 of the laminate L0 has a thickness smaller than the thickness of the second and third portions P2, P3.

A method of manufacturing the suspension board 1 of the present example is similar to the method of manufacturing the suspension board 1 according to the second embodiment except for the following points. In the present example, in the steps of FIGS. 5(a) and 5(b), the wiring trace P is formed instead of the write wiring traces W1, W2, the read wiring traces R1, R2 and the heat-assisted wiring traces H1, H2. In the step of FIG. 5(c), the coating layer 43 is not formed on an insulating layer 41. In the steps of FIGS. 12(b) to 13(b), the connection terminal 26 is not formed.

In the present embodiment, a connection terminal 25 may have a thickness larger than the thickness of the support substrate 10. Alternatively, the connection terminal 25 may have a thickness substantially equal to the thickness of the support substrate 10. In the example of FIG. 22, the connection terminal 25 has a thickness larger than the thickness of the support substrate 10 by the thickness of the metal layer 25b (FIG. 13(b)).

Figure 24:
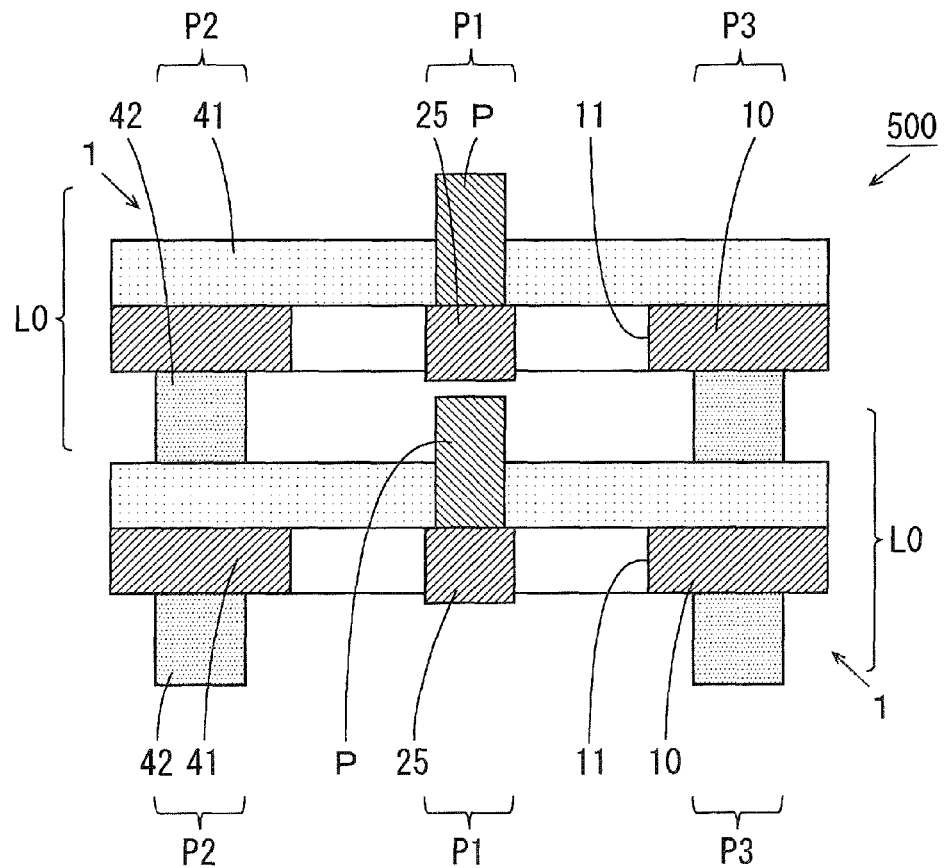
FIG. 24 is a cross sectional view showing part of the plurality of suspension boards formed on the assembly sheet according to the second example of other embodiments.

FIG. 24 is a cross sectional view showing part of the plurality of suspension boards 1 formed on an assembly sheet 500 according to the second example of other embodiments. The assembly sheet 500 of FIG. 24 is wound around a roll RL. FIG. 24 corresponds to a cross sectional view taken along the line C-C of the suspension board 1 of FIG. 20.

As shown in FIG. 24, when the assembly sheet 500 is wound around the roll RL, the support layers 42 at the lower surface of the upper suspension board 1 come into contact with the upper surface of the insulating layer 41 of the lower suspension board 1. Even in such a case, the connection terminal 25 at the lower surface of the upper suspension board 1 does not come into contact with the upper surface of the lower suspension board 1.

In this manner, the thickness of the first portion P1 of the laminate L0 is reduced to be smaller than that of the second and third portions P2, P3, whereby the likelihood that the surface of the connection terminal 25 comes into contact with another member can be reduced. As a result, the likelihood of contamination or damage at the connection terminal 25 can be reduced. Further, in the present example, similarly to the second embodiment, it is possible to reduce the thickness of the first portion P1 of the laminate L0 to be smaller than that of the second and third portions P2, P3 of the laminate L0 without adjusting the thickness of the support substrate 10 and the connection terminal 25.

(3) Third Example

Figure 25:
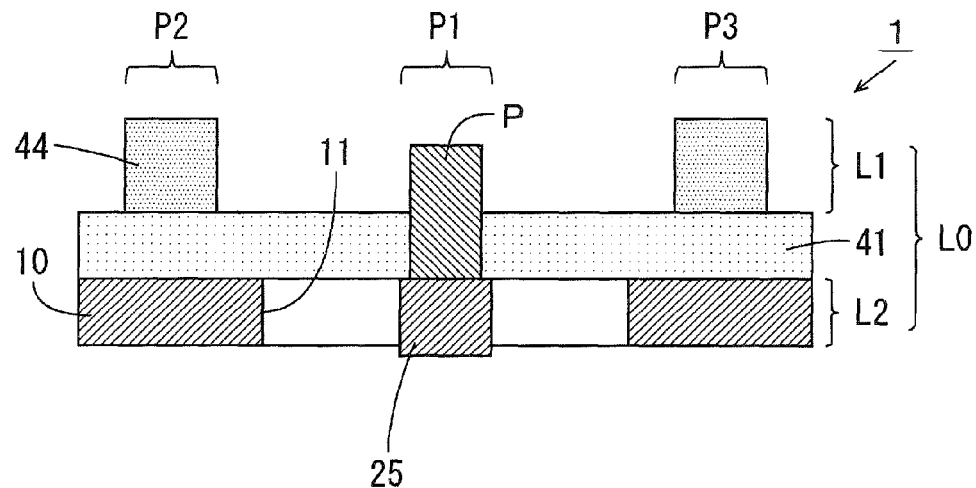
FIG. 25 is a cross sectional view of the suspension board according to the third example of other embodiments.

FIG. 25 is a cross sectional view of a suspension board according to the third example of other embodiments. FIG. 25 corresponds to a cross sectional view taken along the line C-C of FIG. 20. The suspension board 1 according to the third example of other embodiments has the similar configuration to the suspension board 1 according to the first example of other embodiments of FIG. 21.

As shown in FIG. 25, in the suspension board 1 according to the third example of other embodiments, two support layers 44 are provided at the upper surface of an insulating layer 41 and in a region that overlaps with a support substrate 10 to be opposite to each other with a wiring trace P sandwiched therebetween. Similarly to the support layers 44 in the third embodiment, the support layers 44 may be formed of resin, or may be formed of metal.

In the present example, a laminated structure L1 includes the support layers 44. A portion of a laminate L0 that includes the one support layer 44 is a second portion P2, and a portion of the laminate L0 that includes the other support layer 44 is a third portion P3. A first portion P1 of the laminate L0 has a thickness smaller than the thickness of the second and third portions P2, P3.

A method of manufacturing the suspension board 1 of the present example is similar to the method of manufacturing the suspension board 1 according to the third embodiment except for the following points. In the present example, in the steps of FIGS. 5(a) and 5(b), a wiring trace P is formed instead of the write wiring traces W1, W2, the read wiring traces R1, R2 and the heat-assisted wiring traces H1, H2. Further, the connection terminals 21 to 24 are not formed. In the step of FIG. 5(c), the coating layer 43 is not formed on an insulating layer 41, and the two support layers 44 are formed at the upper surface of the insulating layer 41 to be opposite to each other with the wiring trace P sandwiched therebetween. In the steps of FIGS. 12(b) to 13(b), the connection terminal 26 is not formed.

Figure 26:
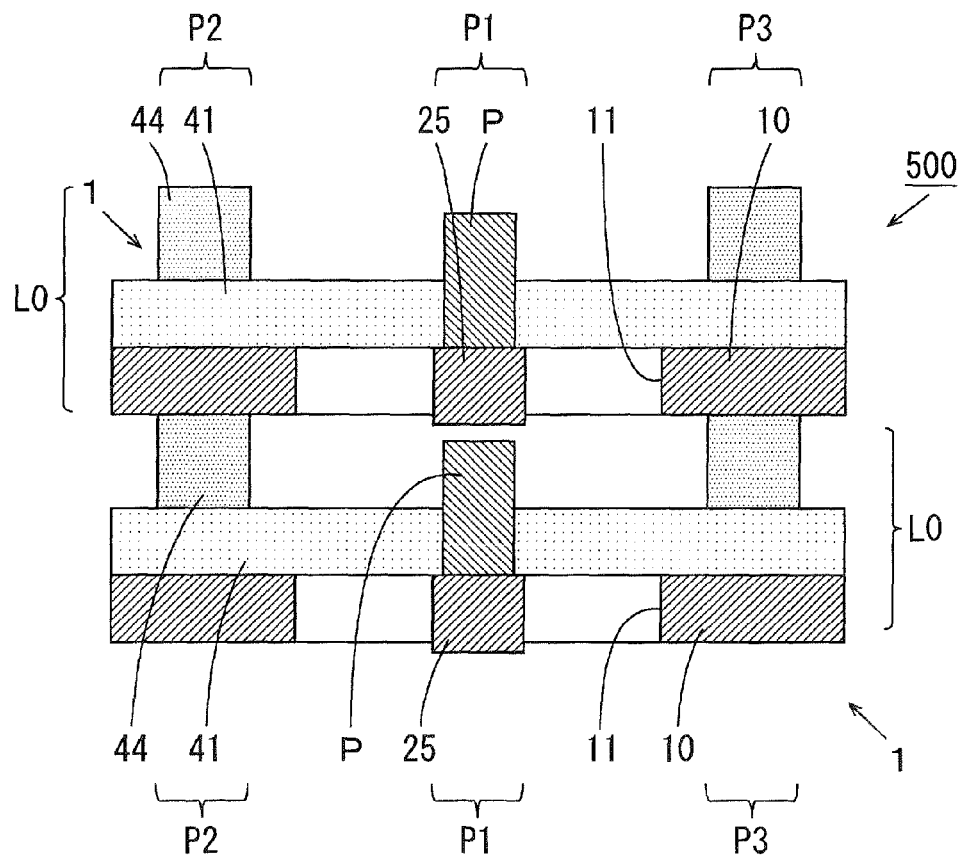
FIG. 26 is a cross sectional view showing part of the plurality of suspension boards formed on the assembly sheet according to the third example of other embodiments.

FIG. 26 is a cross sectional view showing part of the plurality of suspension boards 1 formed on an assembly sheet 500 according to the third example of other embodiments. The assembly sheet 500 of FIG. 26 is wound around a roll RL. FIG. 26 corresponds to a cross sectional view taken along the line C-C of the suspension board 1 of FIG. 20.

As shown in FIG. 26, when the assembly sheet 500 is wound around the roll RL, portions of the support substrate 10 at the lower surface of the upper suspension board 1 come into contact with the support layers 44 at the upper surface of the lower suspension board 1. Even in such a case, the connection terminal 25 at the lower surface of the upper suspension board 1 does not come into contact with the upper surface of the lower suspension board 1.

In this manner, the thickness of the first portion P1 of the laminate L0 is reduced to be smaller than that of the second and third portions P2, P3, whereby the likelihood that the surface of the connection terminal 25 comes into contact with another member can be reduced. As a result, the likelihood of contamination or damage at the connection terminal 25 can be reduced.

(4) Fourth Example

Figure 27:
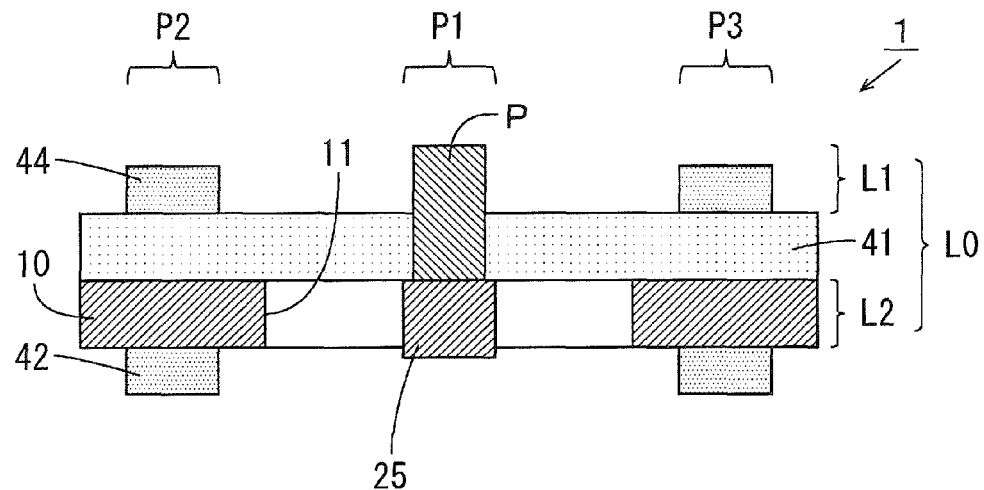
FIG. 27 is a cross sectional view of the suspension board according to the fourth example of other embodiments.

FIG. 27 is a cross sectional view of a suspension board according to the fourth example of other embodiments. FIG. 27 corresponds to a cross sectional view taken along the C-C of FIG. 20. The suspension board 1 according to the fourth example of other embodiments have the similar configuration to the suspension board 1 according to the first example of other embodiments of FIG. 21 except for the following points.

As shown in FIG. 27, in the suspension board 1 according to the fourth example of other embodiments, two support layers 42 are provided at the lower surface of a support substrate 10 to be opposite to each other with a wiring trace P sandwiched therebetween. Further, two support layers 44 are respectively provided at the upper surface of an insulating layer 41 and in regions that respectively overlap with the two support layers 42. The support layers 42, 44 may be formed of resin, or may be formed of metal.

In the present example, a laminated structure L2 includes the support layers 42, and a laminated structure L1 includes the support layers 44. A portion of the laminate L0 that includes the one support layer 42 and the support layer 44 that overlaps with the one support layer 42 is a second portion P2, and a portion of the laminate L0 that includes the other support layer 42 and the support layer 44 that overlaps with the other support layer 42 is a third portion P3. A first portion P1 of the laminate L0 has a thickness smaller than the thickness of the second and third portions P2, P3.

A method of manufacturing the suspension board 1 of the present example is similar to the method of manufacturing the suspension board 1 according to the second embodiment except for the following points. In the present example, in the steps of FIGS. 5(a) and 5(b), a wiring trace P is formed instead of the write wiring traces W1, W2, the read wiring traces R1, R2 and the heat-assisted wiring traces H1, H2. Further, the connection terminals 21 to 24 are not formed. In the step of FIG. 5(c), the coating layer 43 is not formed on the insulating layer 41, and the two support layers 44 are formed at the upper surface of the insulating layer 41 to be opposite to each other with the wiring trace P sandwiched therebetween. In the steps of FIGS. 12(b) to 13(b), the connection terminal 26 is not formed.

Figure 28:
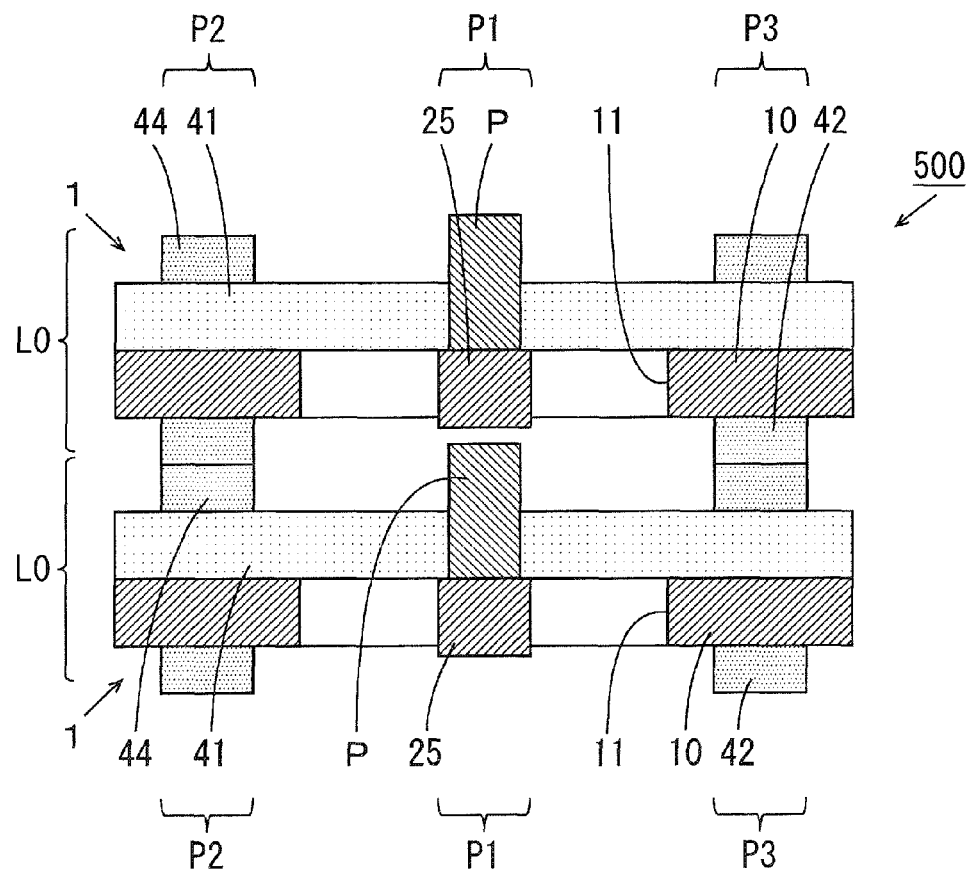
FIG. 28 is a cross sectional view showing part of the plurality of suspension boards formed on the assembly sheet according to the fourth example of other embodiments.

FIG. 28 is a cross sectional view showing part of the plurality of suspension boards 1 formed on an assembly sheet 500 according to the forth example of other embodiments. The assembly sheet 500 of FIG. 28 is wound around a roll RL. FIG. 28 corresponds to a cross sectional view taken along the line C-C of the suspension board 1 of FIG. 20.

As shown in FIG. 28, when the assembly sheet 500 is wound around the roll RL, the support layers 42 at the lower surface of the upper suspension board 1 come into contact with the support layers 44 at the upper surface of the lower suspension board 1. Even in such a case, a connection terminal 25 at the lower surface of the upper suspension board 1 does not come into contact with the upper surface of the lower suspension board 1.

In this manner, the thickness of the first portion P1 of the laminate L0 is reduced to be smaller than that of the second and third portions P2, P3, whereby the likelihood that the surface of the connection terminal 25 comes into contact with another member can be reduced. As a result, the likelihood of contamination or damage at the connection terminal 25 can be reduced.

(5) Support Layer

While the two support layers 42 are provided at the lower surface of the support substrate 10 in the second embodiment and the second and fourth examples in other embodiments, the invention is not limited to this. A support layer in which two support layers 42 are integrally coupled may be provided at the lower surface of the support substrate 10.

Similarly, while the two support layers 44 are provided at the upper surface of the coating layer 43 or the upper surface of the insulating layer 41 in the third embodiment and the third and fourth examples in other embodiments, the invention is not limited to this. A support layer in which two support layers 44 are integrally coupled may be provided at the upper surface of the coating layer 43 or the upper surface of the insulating layer 41.

[5] Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

The insulating layer 41 is an example of a first insulating layer, the laminated structures L1, L2 are respectively first and second laminated structures, the heat-assisted wiring traces H1, H2 or the wiring trace P are examples of a conductive layer and the support substrate 10 is an example of a support substrate. The connection terminals 25, 26 are examples of a connection terminal, the laminate L0 is an example of a laminate, the first to third portions P1 to P3 are respectively examples of first to third portions and the suspension board 1 is an example of a suspension board with a circuit. The support layers 42, 44 are respectively examples of first and second support layers, the coating layer 43 is an example of a second insulating layer, the coupling portion 520a is an example of a support frame, the assembly sheet 500B is an example of a suspension board assembly sheet with a circuit and the roll RL is an example of a roll.

As each of various constituent elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

INDUSTRIAL APPLICABILITY

The present invention can be effectively utilized for a printed circuit board or an electric equipment that has various connection terminals.

We claim:

1. A suspension board with a circuit comprising:
a first insulating layer;
a first laminated structure formed on one surface of the first insulating layer; and
a second laminated structure formed on another surface of the first insulating layer, wherein
the first laminated structure includes a conductor layer, and the second laminated structure includes
a conductive support substrate, and
a connection terminal electrically connected to the conductor layer and electrically insulated from the support substrate,
the connection terminal has a surface exposed at the other surface,
a laminate is formed of the first laminated structure, the first insulating layer and the second laminated structure, and
a first portion of the laminate including the connection terminal has a thickness smaller than thickness of second and third portions of the laminate including portions on both sides of the connection terminal.

2. The suspension board with a circuit according to claim 1, wherein
the connection terminal has a thickness smaller than thickness of the second and third portions of the second laminated structure.

3. The suspension board with a circuit according to claim 2, wherein
the second and third portions of the second laminated structure include one and another portions of the support substrate, and
the connection terminal has a thickness smaller than thickness of each of the one and the other portions of the support substrate.

4. The suspension board with a circuit according to claim 2, wherein
the second and third portions of the second laminated structure include one portion and another portion of the support substrate, and a first support layer formed on the one portion and the other portion of the support substrate, and
the connection terminal has a thickness smaller than total thickness of the one portion and the other portion of the support substrate and the first support layer.

5. The suspension board with a circuit according to claim 1, wherein
the first portion of the first laminated structure has a thickness smaller than the thickness of the second and third portions of the first laminated structure.

6. The suspension board with a circuit according to claim 5, wherein
the first portion of the first laminated structure includes part of the conductor layer, and
the second and third portions of the first laminated structure include a second support layer.

7. The suspension board with a circuit according to claim 1, wherein
the first laminated structure further includes a second insulating layer formed on one surface of the first insulating layer to cover the conductor layer.

8. A suspension board assembly sheet with a circuit comprising:
a plurality of suspension boards with a circuit; and
a support frame that integrally supports the plurality of suspension boards with a circuit, and each of the plurality of suspension boards with a circuit comprising:
a first insulating layer;
a first laminated structure formed on one surface of the first insulating layer; and
a second laminated structure formed on another surface of the first insulating layer, wherein
the first laminated structure includes a conductor layer,
the second laminated structure includes a conductive support substrate, and a connection terminal electrically connected to the conductor layer and electrically insulated from the support substrate, the connection terminal has a surface exposed at the other surface, a laminate is formed of the first laminated structure, the first insulating layer and the second laminated structure, and a portion of the laminate including the connection terminal has a thickness smaller than thickness of portions of the support frame positioned on both sides of the connection terminal.

9. A method of manufacturing a suspension board with a circuit including the steps of:

forming a first laminated structure on one surface of a first insulating layer; and forming a second laminated structure on another surface of the first insulating layer, wherein the step of forming the first laminated structure includes forming a conductor layer, the step of forming the second laminated structure includes forming a conductive support substrate, and a connection terminal electrically connected to the conductor layer and electrically insulated from the support substrate, the connection terminal has a surface exposed at another surface, a laminate is formed of the first laminated structure, the first insulating layer and the second laminated structure, and a first portion of the laminate including the connection terminal has a thickness smaller than thickness of second and third portions of the laminate including portions on both sides of the connection terminal.

10. A method of manufacturing a suspension board assembly sheet with a circuit including the steps of:

forming a plurality of suspension boards with a circuit according to claim 1 and a support frame integrally supports the plurality of suspension boards with a circuit; and winding the suspension board assembly sheet with a circuit around a roll.

11. A method of manufacturing a suspension board assembly sheet with a circuit, including the steps of:

forming the suspension board assembly sheet with a circuit according to claim 8; and winding the suspension board assembly sheet with a circuit around a roll.

\* \* \* \* \*